US009683154B2

(12) United States Patent
Rached

(10) Patent No.: US 9,683,154 B2
(45) Date of Patent: Jun. 20, 2017

(54) HEAT-TRANSFER FLUIDS AND USE THEREOF IN COUNTERCURRENT HEAT EXCHANGERS

(71) Applicant: Arkema France, Colombes (FR)

(72) Inventor: Wissam Rached, Chaponost (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 14/645,031

(22) Filed: Mar. 11, 2015

(65) Prior Publication Data

US 2015/0184051 A1   Jul. 2, 2015

Related U.S. Application Data

(62) Division of application No. 13/696,866, filed as application No. PCT/FR2011/050880 on Apr. 18, 2011, now Pat. No. 9,005,468.

(30) Foreign Application Priority Data

May 11, 2010  (FR) ..................... 10 53668

(51) Int. Cl.
    *C09K 5/04*   (2006.01)
(52) U.S. Cl.
    CPC ........ *C09K 5/045* (2013.01); *C09K 2205/126* (2013.01); *C09K 2205/22* (2013.01)
(58) Field of Classification Search
    CPC ............... C09K 5/045; C09K 2205/22; C09K 2205/126
    See application file for complete search history.

(56) References Cited

U.S. PATENT DOCUMENTS

| 5,076,064 | A  | 12/1991 | Kopko |
| 5,363,674 | A  | 11/1994 | Powell |
| 6,248,255 | B1 | 6/2001  | Pearson |
| 6,991,743 | B2 | 1/2006  | Poole et al. |
| 8,070,977 | B2 | 12/2011 | Rached |
| 8,075,798 | B2 | 12/2011 | Rached |
| 8,951,432 | B2 | 2/2015  | Boutier et al. |
| 9,005,468 | B2 | 4/2015  | Rached |
| 9,315,706 | B2 | 4/2016  | Boussand |
| 9,512,343 | B2 | 12/2016 | Rached et al. |
| 2004/0089839 | A1 | 5/2004 | Thomas et al. |
| 2006/0243944 | A1 | 11/2006 | Minor et al. |
| 2007/0069175 | A1 | 3/2007 | Thomas et al. |
| 2008/0111099 | A1 | 5/2008 | Singh et al. |
| 2008/0184731 | A1 | 8/2008 | Sienel et al. |
| 2008/0314073 | A1 | 12/2008 | Minor |
| 2009/0120619 | A1 | 5/2009 | Sievert et al. |
| 2009/0158771 | A1 | 6/2009 | Low et al. |
| 2009/0241562 | A1 | 10/2009 | Thomas et al. |
| 2009/0314015 | A1 | 12/2009 | Minor |
| 2010/0044619 | A1 | 2/2010 | Hulse et al. |
| 2010/0108936 | A1 | 5/2010 | Kaneko |
| 2010/0133463 | A1 | 6/2010 | Kaneko |
| 2010/0186432 | A1 | 7/2010 | Perti et al. |
| 2010/0319377 | A1 | 12/2010 | Moriwaki et al. |
| 2010/0326129 | A1 | 12/2010 | Moriwaki et al. |
| 2011/0011124 | A1 | 1/2011 | Matsuura et al. |
| 2011/0258147 | A1 | 10/2011 | Low |
| 2012/0068104 | A1 | 3/2012 | Rached et al. |
| 2012/0068105 | A1 | 3/2012 | Rached et al. |
| 2012/0097885 | A9 | 4/2012 | Hulse et al. |
| 2012/0126187 | A1 | 5/2012 | Low |
| 2012/0292556 | A1 | 11/2012 | Van Horn |
| 2013/0055733 | A1 | 3/2013 | Rached |
| 2013/0055739 | A1 | 3/2013 | Rached |
| 2013/0061613 | A1 | 3/2013 | Rached |
| 2013/0299733 | A1 | 11/2013 | Boussand |
| 2014/0110623 | A1 | 4/2014 | Boutier et al. |
| 2016/0031773 | A1 | 2/2016 | Bonnet et al. |
| 2016/0032165 | A1 | 2/2016 | Boussand |

FOREIGN PATENT DOCUMENTS

| EP | 2 149 592 A2 | 2/2010 |
| JP | 4-110388 | 4/1992 |
| JP | 2009-222362 A1 | 10/2009 |
| JP | 2012-524137 A1 | 10/2012 |
| WO | WO 97/17414 A1 | 5/1997 |
| WO | WO 2004/037913 A2 | 5/2004 |
| WO | WO 2005/108522 A1 | 11/2005 |
| WO | WO 2007/002625 A2 | 1/2007 |
| WO | WO 2007/053697 A2 | 5/2007 |
| WO | WO 2007/053697 A3 | 5/2007 |
| WO | WO 2007/126414 A2 | 11/2007 |
| WO | WO 2008/053951 A1 | 5/2008 |

(Continued)

OTHER PUBLICATIONS

International Search Report (English translation) issued in International Patent Application No. PCT/FR2011/050880, Dec. 28, 2011, 4 pages, European Patent Office, Rijswijk, NL.

Bonnet, Phillippe, et al., U.S. Appl. No. 14/773,961 entitled "Composition Comprising HF and 1,3,3,3-Tetrafluoropropene," filed in the U.S. Patent and Trademark Office Sep. 9, 2015.

Boussand, Béatrice, U.S. Appl. No. 14/880,605 entitled "3,3,3-Trifluoropropene Composition," filed in the U.S. Patent and Trademark Office Oct. 12, 2015.

Kontomaris, Kostas, et al., "Low GWP Refrigerants for Centrifugal Chillers," ASHRAE Annual Conference, Jun. 20-24, 2009, 23 pages, Louisville, KY, DuPont Fluoroproducts, XP002604604.

(Continued)

*Primary Examiner* — John Hardee

(74) *Attorney, Agent, or Firm* — Buchanan Ingersoll & Rooney P.C.

(57) ABSTRACT

A ternary composition including difluoromethane, 3,3,3-trifluoropropene and a hydrocarbon-derived compound containing at least two fluorine atoms and having a boiling point of between −30 and −18° C., which is selected from 1,1-difluoroethane, 2,3,3,3-tetrafluoropropene and 1,3,3,3-tetrafluoropropene. This composition is particularly suitable for use as a heat-transfer fund in the presence of countercurrent heat exchangers.

22 Claims, No Drawings

(56) References Cited

FOREIGN PATENT DOCUMENTS

| | | |
|---|---|---|
| WO | WO 2008/130026 A1 | 10/2008 |
| WO | WO 2009/018117 A1 | 2/2009 |
| WO | WO 2009/047535 A2 | 4/2009 |
| WO | WO 2009/047535 A3 | 4/2009 |
| WO | WO 2009/107364 A1 | 9/2009 |
| WO | WO 2009/110228 A1 | 9/2009 |
| WO | WO 2009/114398 A1 | 9/2009 |
| WO | WO 2009/116282 A1 | 9/2009 |
| WO | WO 2009/150763 A1 | 12/2009 |
| WO | WO 2009/151669 A1 | 12/2009 |
| WO | WO 2010/000993 A2 | 1/2010 |
| WO | WO 2010/000993 A3 | 1/2010 |
| WO | WO 2010/000994 A2 | 1/2010 |
| WO | WO 2010/000994 A3 | 1/2010 |
| WO | WO 2010/059677 A2 | 5/2010 |
| WO | WO 2010/059677 A3 | 5/2010 |
| WO | WO 2010/064005 A1 | 6/2010 |
| WO | WO 2010/119265 A1 | 10/2010 |
| WO | WO 2011/023923 A1 | 3/2011 |
| WO | WO 2011/082003 A1 | 7/2011 |
| WO | WO 2011/101608 A1 | 8/2011 |
| WO | WO 2011/101621 A2 | 8/2011 |
| WO | WO 2011/101621 A3 | 8/2011 |

OTHER PUBLICATIONS

Taira, Shigeharu, et al., "Examination regarding Air conditioning and Heat Pump WaterSystem using Post New alternative Refrigerant," International Symposium on Next-Generation Air Conditioning and Refrigeration Technology, Feb. 17, 2010, 8 pages, Tokyo, JP, XP002604605.

Brasz, J.J., "Variable-speed centrifugal compressor behavior with low GWP refrigerants," International Conference on Compressors and Their Systems, Sep. 7, 2009, pp. 247-256, London, UK, XP008127860.

Rached, Wissam, et al., U.S. Appl. No. 15/297,569 entitled "Composition Based on 2,3,3,3-Tetrafluoropropene," filed in the U.S. Patent and Trademark Office on Oct. 19, 2016.

Rached, Wissam, U.S. Appl. No. 15/343,664 entitled "Heat-Transfer Fluid for a Centrifugal Compressor," filed in the U.S. Patent and Trademark Office on Nov. 4, 2016.

Notification of Reasons for Refusal issued in JP Patent Application No. 2016-052006, Apr. 19, 2017, 9 pages (pp. 1-5—Japanese document/pp. 6-9—English-language translation).

HEAT-TRANSFER FLUIDS AND USE THEREOF IN COUNTERCURRENT HEAT EXCHANGERS

CROSS REFERENCE TO RELATED APPLICATIONS

The present application is a divisional of U.S. application Ser. No. 13/696,866, filed on Nov. 8, 2012, which is U.S. National Phase of International Application No. PCT/FR2011/050880, filed on Apr. 18, 2011 claims the benefit of French Application No. 1053668, filed on May 11, 2010. The entire contents of each of U.S. application Ser. No. 13/696,866, International Application No. PCT/FR2011/05088, and French Application No. 1053668 are hereby incorporated herein by reference in their entirety.

FIELD OF THE INVENTION

The present invention relates to heat-transfer fluids suitable for use in countercurrent heat exchangers.

TECHNICAL BACKGROUND

Fluids based on fluorocarbon compounds are widely used in vapor-compression heat-transfer systems, in particular air conditioning, heat pump, refrigeration and freezing devices. These devices have in common the fact that they are based on a thermodynamic cycle comprising the vaporization of the fluid at low pressure (in which the fluid absorbs heat); the compression of the vaporized fluid up to a high pressure; the condensation of the vaporized fluid to liquid at high pressure (in which the fluid releases heat); and the expansion of the fluid in order to complete the cycle.

Vapor compression heat-transfer systems comprise at least two heat exchangers, one in which the fluid vaporizes, and the other in which it condenses. Heat exchangers may be of cocurrent type or of countercurrent type.

The choice of a heat-transfer fluid (which may be a pure compound or a mixture of compounds) is dictated, on the one hand, by the thermodynamic properties of the fluid, and on the other hand, by additional constraints. Thus, one particularly important criterion is that of the impact of the fluid considered on the environment. In particular, chlorinated compounds (chlorofluorocarbons and hydrochlorofluorocarbons) have the disadvantage of damaging the ozone layer. Henceforth, generally non-chlorinated compounds such as hydrofluorocarbons, fluoroethers and fluoroolefins are therefore preferred to them.

Heat-transfer fluids currently used are HFC-134a, R404a (ternary mixture of 52% of HFC-143a, 44% of HFC-125 and 4% HFC-134a), R407c (ternary mixture of 52% of HFC-134a, 25% of HFC-125 and 23% of HFC-32) and R410a (binary mixture of 50% of HFC-32 and 50% of HFC-125).

It is, however, necessary to develop other heat-transfer fluids that have a global warming potential (GWP) lower than that of the fluids above, and that have equivalent or improved performance levels.

Document WO 2007/002625 describes compositions based on fluoroolefins, and in particular on HFO-1234yf or on HFO-1234ze, in various uses, and in particular as heat-transfer fluids. The document does not specify the type of heat exchanger used.

Document WO 2007/126414 describes generally a large variety of fluoroolefin-based compositions and a large variety of uses of these compositions. The document does not specify the type of heat exchanger used.

Documents WO 2009/107364, WO 2009/110228 and WO 2009/116282 describe refrigeration apparatuses in which the refrigerants used are mixtures based on HFO-1234yf and on HFC-32, optionally supplemented or replaced with other compounds, such as HFC-125. The type of heat exchanger used is not specified.

Document US 2009/0158771 describes the use of a ternary mixture comprising HFC-32, HFC-134a and HFO-1243zf, in a heat transfer application. The coefficients of performance that are obtained are lower than those of the fluid taken as reference, namely HFC-134a. The type of heat exchanger used is not specified.

Document WO 2009/150763 describes an air-conditioning apparatus with a countercurrent heat exchanger, in which the heat-transfer fluid is a mixture of an HFO-1234 and of HFC-32 or of HFC-41.

Document WO 2010/000993 describes the use of a ternary mixture comprising HFO-1234yf, HFC-32 and HFC-134a, as a heat-transfer fluid. The document does not specify the type of heat exchanger used.

Document WO 2010/000994 describes the use of a ternary mixture comprising HFO-1234yf, HFC-32 and HFC-152a, as a heat-transfer fluid. The document does not specify the type of heat exchanger used.

However, there is still a need to develop other heat-transfer fluids that have a relatively low GWP and that have good energy performance levels, in particular in applications using countercurrent heat exchangers.

SUMMARY OF THE INVENTION

The invention relates firstly to a ternary composition comprising difluoromethane, 3,3,3-trifluoropropene and a hydrocarbon-derived compound containing at least two fluorine atoms and having a boiling point of between −30 and −18° C., which is selected from 1,1-difluoroethane, 2,3,3,3-tetrafluoropropene and 1,3,3,3-tetrafluoropropene.

According to one embodiment, the composition comprises difluoromethane, 1,1-difluoroethane and 3,3,3-trifluoropropene, and preferably comprises from 2 to 96% of difluoromethane, from 2 to 96% of 1,1-difluoroethane and from 2 to 96% of 3,3,3-trifluoropropene, and particularly preferably:

from 20 to 70% of difluoromethane, from 2 to 30% of 1,1-difluoroethane and from 2 to 78% of 3,3,3-trifluoropropene, ideally from 25 to 65% of difluoromethane, from 2 to 15% of 1,1-difluoroethane and from 20 to 78% of 3,3,3-trifluoropropene; or from 60 to 96% of difluoromethane, from 2 to 20% of 1,1-difluoroethane and from 2 to 20% of 3,3,3-trifluoropropene, ideally from 80 to 90% of difluoromethane, from 5 to 15% of 1,1-difluoroethane and from 5 to 15% of 3,3,3-trifluoropropene; or from 2 to 20% of difluoromethane, from 2 to 85% of 1,1-difluoroethane and from 2 to 90% of 3,3,3-trifluoropropene, ideally from 5 to 15% of difluoromethane, from 5 to 85% of 1,1-difluoroethane and from 10 to 90% of 3,3,3-trifluoropropene; or from 20 to 60% of difluoromethane, from 2 to 70% of 1,1-difluoroethane and from 2 to 70% of 3,3,3-trifluoropropene, ideally from 25 to 40% of difluoromethane, from 5 to 65% of 1,1-difluoroethane and from 5 to 70% of 3,3,3-trifluoropropene; or from 50 to 96% of difluoromethane, from 2 to 30% of 1,1-difluoroethane and from 2 to 30% of 3,3,3-trifluoropropene, ideally from 65 to 80% of difluoromethane, from 5 to 25% of 1,1-difluoroethane and from 5 to 30% of 3,3,3-trifluoropropene.

According to another embodiment, the composition comprises difluoromethane, 3,3,3-trifluoropropene and 2,3,3,3-tetrafluoropropene, preferably from 2 to 96% of difluoromethane, from 2 to 96% of 3,3,3-trifluoropropene and from 2 to 96% of 2,3,3,3-tetrafluoropropene, and particularly preferably:
- from 5 to 70% of 2,3,3,3-tetrafluoropropene, from 20 to 60% of difluoromethane and from 2 to 75% of 3,3,3-trifluoropropene, ideally from 10 to 70% of 2,3,3,3-tetrafluoropropene, from 25 to 50% of difluoromethane and from 2 to 65% of 3,3,3-trifluoropropene; or
- from 2 to 40% of 2,3,3,3-tetrafluoropropene, from 58 to 90% of difluoromethane and from 2 to 40% of 3,3,3-trifluoropropene, ideally from 5 to 30% of 2,3,3,3-tetrafluoropropene, from 65 to 80% of difluoromethane and from 2 to 15% of 3,3,3-trifluoropropene; or
- from 5 to 75% of 2,3,3,3-tetrafluoropropene, from 2 to 20% of difluoromethane and from 2 to 90% of 3,3,3-trifluoropropene, ideally from 5 to 75% of 2,3,3,3-tetrafluoropropene, from 5 to 15% of difluoromethane and from 10 to 90% of 3,3,3-trifluoropropene; or
- from 5 to 80% of 2,3,3,3-tetrafluoropropene, from 20 to 50% of difluoromethane and from 2 to 75% of 3,3,3-trifluoropropene, ideally from 5 to 65% of 2,3,3,3-tetrafluoropropene, from 25 to 30% of difluoromethane and from 2 to 70% of 3,3,3-trifluoropropene; or
- from 2 to 30% of 2,3,3,3-tetrafluoropropene, from 60 to 90% of difluoromethane and from 2 to 30% of 3,3,3-trifluoropropene, ideally from 5 to 25% of 2,3,3,3-tetrafluoropropene, from 65 to 80% of difluoromethane and from 5 to 30% of 3,3,3-trifluoropropene; or
- from 2 to 30% of 2,3,3,3-tetrafluoropropene, from 68 to 96% of difluoromethane and from 2 to 20% of 3,3,3-trifluoropropene, ideally from 8 to 23% of 2,3,3,3-tetrafluoropropene, from 75 to 90% of difluoromethane and from 2 to 10% of 3,3,3-trifluoropropene; or
- from 2 to 40% of 2,3,3,3-tetrafluoropropene, from 58 to 90% of difluoromethane and from 2 to 40% of 3,3,3-trifluoropropene, ideally from 2 to 23% of 2,3,3,3-tetrafluoropropene, from 75 to 90% of difluoromethane and from 2 to 18% of 3,3,3-trifluoropropene.

According to one embodiment, the composition comprises difluoromethane, 3,3,3-trifluoropropene and 1,3,3,3-tetrafluoropropene, preferably from 2 to 96% of difluoromethane, from 2 to 96% of 3,3,3-trifluoropropene and from 2 to 96% of 1,3,3,3-tetrafluoropropene, and particularly preferably:
- from 25 to 70% of difluoromethane, from 2 to 70% of 3,3,3-trifluoropropene and from 5 to 73% of 1,3,3,3-tetrafluoropropene, ideally from 25 to 50% of difluoromethane, from 5 to 70% of 3,3,3-trifluoropropene and from 5 to 55% of 1,3,3,3-tetrafluoropropene; or
- from 50 to 96% of difluoromethane, from 2 to 50% of 3,3,3-trifluoropropene and from 2 to 50% of 1,3,3,3-tetrafluoropropene, ideally from 65 to 90% of difluoromethane, from 5 to 30% of 3,3,3-trifluoropropene and from 5 to 30% of 1,3,3,3-tetrafluoropropene; or
- from 2 to 25% of difluoromethane, from 2 to 90% of 3,3,3-trifluoropropene and from 5 to 96% of 1,3,3,3-tetrafluoropropene, ideally from 5 to 25% of difluoromethane, from 5 to 90% of 3,3,3-trifluoropropene and from 5 to 90% of 1,3,3,3-tetrafluoropropene; or
- from 20 to 65% of difluoromethane, from 2 to 70% of 3,3,3-trifluoropropene and from 5 to 78% of 1,3,3,3-tetrafluoropropene, ideally from 25 to 50% of difluoromethane, from 5 to 70% of 3,3,3-trifluoropropene and from 5 to 70% of 1,3,3,3-tetrafluoropropene; or
- from 50 to 96% of difluoromethane, from 2 to 48% of 3,3,3-trifluoropropene and from 2 to 30% of 1,3,3,3-tetrafluoropropene, ideally from 65 to 90% of difluoromethane, from 5 to 30% of 3,3,3-trifluoropropene and from 5 to 30% of 1,3,3,3-tetrafluoropropene.

According to another embodiment, the composition comprises from 75 to 98% of difluoromethane, from 1 to 9% of 1,1-difluoroethane and 1 to 23% of 3,3,3-trifluoropropene.

According to another embodiment, the composition comprises from 70 to 98% of difluoromethane, from 1 to 23% of 3,3,3-trifluoropropene and from 1 to 28% of 2,3,3,3-tetrafluoropropene.

According to another embodiment, the composition comprises from 75 to 98% of difluoromethane, from 1 to 23% of 3,3,3-trifluoropropene and from 1 to 10% of 1,3,3,3-tetrafluoropropene.

The invention also relates to the use of the abovementioned composition, as a heat-transfer fluid in a vapor compression circuit.

According to one embodiment, the vapor compression circuit comprises a countercurrent heat exchanger.

The invention also relates to a heat-transfer composition comprising the abovementioned composition as heat-transfer fluid, and one or more additives selected from lubricants, stabilizers, surfactants, tracers, fluorescent agents, odorous agents, solubilizing agents and mixtures thereof.

The invention also relates to heat-transfer equipment comprising a vapor compression circuit containing the abovementioned composition as heat-transfer fluid or containing the abovementioned heat-transfer composition.

According to one embodiment, the equipment comprises a countercurrent heat exchanger.

According to one embodiment, the equipment is selected from mobile or stationary equipment for heating via a heat pump, for air conditioning, for refrigeration and for freezing.

The invention also relates to a process for heating or cooling a fluid or a body by means of a vapor compression circuit containing a heat-transfer fluid, said process successively comprising the evaporation of the heat-transfer fluid, the compression of the heat-transfer fluid, the condensation of the heat fluid and the expansion of the heat-transfer fluid, in which the heat-transfer fluid is the composition according to the invention.

According to one embodiment, the abovementioned process is a process for cooling a fluid or a body, in which the temperature of the fluid or of the body cooled is from −40° C. to −10° C., and preferably from −35° C. to −25° C., more particularly preferably from −30° C. to −20° C., and in which the heat-transfer fluid comprises:
- from 20 to 70% of difluoromethane, from 2 to 30% of 1,1-difluoroethane and from 2 to 78% of 3,3,3-trifluoropropene, ideally from 25 to 65% of difluoromethane, from 2 to 15% of 1,1-difluoroethane and from 20 to 78% of 3,3,3-trifluoropropene; or
- from 60 to 96% of difluoromethane, from 2 to 20% of 1,1-difluoroethane and from 2 to 20% of 3,3,3-trifluoropropene, ideally from 80 to 90% of difluoromethane, from 5 to 15% of 1,1-difluoroethane and from 5 to 15% of 3,3,3-trifluoropropene; or
- from 5 to 70% of 2,3,3,3-tetrafluoropropene, from 20 to 60% of difluoromethane and 2 to 75% of 3,3,3-trifluoropropene, ideally from 10 to 70% of 2,3,3,3-tetrafluoropropene, from 25 to 50% of difluoromethane and from 2 to 65% of 3,3,3-trifluoropropene; or from 2 to 40% of 2,3,3,3-tetrafluoropropene, from 58 to 90% of difluoromethane and 2 to 40% of 3,3,3-trifluoropropene, ideally from 5 to 30% of 2,3,3,3-tetrafluoropropene, from 65 to 80% of difluoromethane and from 2 to 15% of 3,3,3-trifluoropropene; or from 25 to 70% of difluoromethane, from 2 to 70% of 3,3,3-trifluoropropene and from 5 to 73% of 1,3,3,3-tetrafluoropropene, ideally from 25 to 50% of difluoromethane, from 5 to 70% of 3,3,3-trifluoropropene and from 5 to 55% of 1,3,3,3-tetrafluoropropene; or from 50 to 96% of difluoromethane, from 2 to 50% of 3,3,3-trifluoropropene and from 2 to 50% of 1,3,3,3-tetrafluoropropene, ideally from 65 to 90% of difluoromethane, from 5 to 30% of 3,3,3-trifluoropropene and from 5 to 30% of 1,3,3,3-tetrafluoropropene; or from 2 to 30% of 2,3,3,3-tetrafluoropropene, from 68 to 96% of difluoromethane and from 2 to 20% of 3,3,3-trifluoropropene, ideally from 8 to 23% of 2,3,3,3-tetrafluoropropene, from 75 to 90% of difluoromethane and from 2 to 10% of 3,3,3-trifluoropropene.

According to another embodiment, the abovementioned process is a process for cooling a fluid or a body, in which the temperature of the fluid or of the body cooled is from −15° C. to 15° C., and preferably from −10° C. to 10° C., more particularly preferably from −5° C. to 5° C., and in which the heat-transfer fluid comprises:

from 2 to 20% of difluoromethane, from 2 to 85% of 1,1-difluoroethane and from 2 to 90% of 3,3,3-trifluoropropene, ideally from 5 to 15% of difluoromethane, from 5 to 85% of 1,1-difluoroethane and from 10 to 90% of 3,3,3-trifluoropropene; or from 20 to 60% of difluoromethane, from 2 to 70% of 1,1-difluoroethane and from 2 to 70% of 3,3,3-trifluoropropene, ideally from 25 to 40% of difluoromethane, from 5 to 65% of 1,1-difluoroethane and from 5 to 70% of 3,3,3-trifluoropropene; or from 50 to 96% of difluoromethane, from 2 to 30% of 1,1-difluoroethane and from 2 to 30% of 3,3,3-trifluoropropene, ideally from 65 to 80% of difluoromethane, from 5 to 25% of 1,1-difluoroethane and from 5 to 30% of 3,3,3-trifluoropropene; or from 5 to 75% of 2,3,3,3-tetrafluoropropene, from 2 to 20% of difluoromethane and from 2 to 90% of 3,3,3-trifluoropropene, ideally from 5 to 75% of 2,3,3,3-tetrafluoropropene, from 5 to 15% of difluoromethane and from 10 to 90% of 3,3,3-trifluoropropene; or from 5 to 80% of 2,3,3,3-tetrafluoropropene, from 20 to 50% of difluoromethane and from 2 to 75% of 3,3,3-trifluoropropene, ideally from 5 to 65% of 2,3,3,3-tetrafluoropropene, from 25 to 35% of difluoromethane and from 2 to 70% of 3,3,3-trifluoropropene; or from 2 to 30% of 2,3,3,3-tetrafluoropropene, from 60 to 90% of difluoromethane and from 2 to 30% of 3,3,3-trifluoropropene, ideally from 5 to 25% of 2,3,3,3-tetrafluoropropene, from 65 to 80% of difluoromethane and from 5 to 30% of 3,3,3-trifluoropropene; or from 2 to 25% of difluoromethane, from 2 to 90% of 3,3,3-trifluoropropene and from 5 to 96% of 1,3,3,3-tetrafluoropropene, ideally from 5 to 25% of difluoromethane, from 5 to 90% of 3,3,3-trifluoropropene and from 5 to 90% of 1,3,3,3-tetrafluoropropene; or from 20 to 65% of difluoromethane, from 2 to 70% of 3,3,3-trifluoropropene and from 5 to 78% of 1,3,3,3-tetrafluoropropene, ideally from 25 to 50% of difluoromethane, from 5 to 70% of 3,3,3-trifluoropropene and from 5 to 70% of 1,3,3,3-tetrafluoropropene; or from 50 to 96% of difluoromethane, from 2 to 48% of 3,3,3-trifluoropropene and from 2 to 30% of 1,3,3,3-tetrafluoropropene, ideally from 65 to 90% of difluoromethane, from 5 to 30% of 3,3,3-trifluoropropene and from 5 to 30% of 1,3,3,3-tetrafluoropropene; or from 2 to 40% of 2,3,3,3-tetrafluoropropene, from 58 to 90% of difluoromethane and from 2 to 40% of 3,3,3-trifluoropropene, ideally from 2 to 23% of 2,3,3,3-tetrafluoropropene, from 75 to 90% of difluoromethane and from 2 to 18% of 3,3,3-trifluoropropene.

According to another embodiment, the abovementioned process is a process for heating a fluid or a body, in which the temperature of the fluid or of the body heated is from 30° C. to 80° C., and preferably from 35° C. to 55° C., more particularly preferably from 40° C. to 50° C., in which the heat-transfer fluid comprises:

from 2 to 20% of difluoromethane, from 2 to 85% of 1,1-difluoroethane and from 2 to 90% of 3,3,3-trifluoropropene, ideally from 5 to 15% of difluoromethane, from 5 to 85% of 1,1-difluoroethane and from 10 to 90% of 3,3,3-trifluoropropene; or from 20 to 60% of difluoromethane, from 2 to 70% of 1,1-difluoroethane and from 2 to 70% of 3,3,3-trifluoropropene, ideally from 25 to 40% of difluoromethane, from 5 to 65% of 1,1-difluoroethane and from 5 to 70% of 3,3,3-trifluoropropene; or from 50 to 96% of difluoromethane, from 2 to 30% of 1,1-difluoroethane and from 2 to 30% of 3,3,3-trifluoropropene, ideally from 65 to 80% of difluoromethane, from 5 to 25% of 1,1-difluoroethane and from 5 to 30% of 3,3,3-trifluoropropene; or from 5 to 75% of 2,3,3,3-tetrafluoropropene, from 2 to 20% of difluoromethane and from 2 to 90% of 3,3,3-trifluoropropene, ideally from 5 to 75% of 2,3,3,3-tetrafluoropropene, from 5 to 15% of difluoromethane and from 10 to 90% of 3,3,3-trifluoropropene; or from 5 to 80% of 2,3,3,3-tetrafluoropropene, from 20 to 50% of difluoromethane and from 2 to 75% of 3,3,3-trifluoropropene, ideally from 5 to 65% of 2,3,3,3-tetrafluoropropene, from 25 to 35% of difluoromethane and from 2 to 70% of 3,3,3-trifluoropropene; or from 2 to 35% of 2,3,3,3-tetrafluoropropene, from 60 to 90% of difluoromethane and from 2 to 30% of 3,3,3-trifluoropropene, ideally from 5 to 25% of 2,3,3,3-tetrafluoropropene, from 65 to 80% of difluoromethane and from 5 to 30% of 3,3,3-trifluoropropene; or from 2 to 25% of difluoromethane, from 2 to 90% of 3,3,3-trifluoropropene and from 5 to 96% of 1,3,3,3-tetrafluoropropene, ideally from 5 to 25% of difluoromethane, from 5 to 90% of 3,3,3-trifluoropropene and from 5 to 90% of 1,3,3,3-tetrafluoropropene; or from 20 to 65% of difluoromethane, from 2 to 70% of 3,3,3-trifluoropropene and from 5 to 78% of 1,3,3,3-tetrafluoropropene, ideally from 25 to 50% of difluoromethane, from 5 to 70% of 3,3,3-trifluoropropene and from 5 to 70% of 1,3,3,3-tetrafluoropropene; or from 50 to 96% of difluoromethane, from 2 to 48% of 3,3,3-trifluoropropene and from 2 to 30% of 1,3,3,3-tetrafluoropropene, ideally from 65 to 90% of difluoromethane, from 5 to 30% of 3,3,3-trifluoropropene and from 5 to 30% of 1,3,3,3-tetrafluoropropene; or from 2 to 40% of 2,3,3,3-tetrafluoropropene, from 58 to 90% of difluoromethane and from 2 to 40% of 3,3,3-trifluoropropene, ideally from 2 to 23% of 2,3,3,3-tetrafluoropropene, from 75 to 90% of difluoromethane and from 2 to 18% of 3,3,3-trifluoropropene.

The invention also relates to a process for reducing the environmental impact of heat-transfer equipment comprising a vapor compression circuit containing an initial heat-transfer fluid, said process comprising a step of replacing the initial heat-transfer fluid in the vapor compression circuit with a final transfer fluid, the final transfer fluid having a GWP lower than the initial heat-transfer fluid, in which the final heat-transfer fluid is a composition according to the invention.

According to one embodiment of said process for reducing the environmental impact, the initial heat-transfer fluid is a ternary mixture of 52% of 1,1,1-trifluoroethane, 44% of pentafluoroethane and 4% of 1,1,1,2-tetrafluoroethane or a ternary mixture of 52% of 1,1,1,2-tetrafluoroethane, 25% of pentafluoroethane and 23% of difluoromethane, and the final heat-transfer fluid comprises:

from 20 to 70% of difluoromethane, from 2 to 30% of 1,1-difluoroethane and from 2 to 78% of 3,3,3-trifluoropropene, ideally from 25 to 65% of difluoromethane, from 2 to 15% of 1,1-difluoroethane and from 20 to 78% of 3,3,3-trifluoropropene; or from 20 to 60% of difluoromethane, from 2 to 70% of 1,1-difluoroethane and from 2 to 70% of 3,3,3-trifluoropropene, ideally from 25 to 40% of difluoromethane, from 5 to 65% of 1,1-difluoroethane and from 5 to 70% of 3,3,3-trifluoropropene; or from 5 to 70% of 2,3,3,3-tetrafluoropropene, from 20 to 60% of difluoromethane and from 2 to 75% of 3,3,3-trifluoropropene, ideally from 10 to 70% of 2,3,3,3-tetrafluoropropene, from 25 to 50% of difluoromethane and from 2 to 65% of 3,3,3-trifluoropropene; or from 5 to 80% of 2,3,3,3-tetrafluoropropene, from 20 to 50% of difluoromethane and from 2 to 75% of 3,3,3-trifluoropropene, ideally from 5 to 65% of 2,3,3,3-tetrafluoropropene, from 25 to 3% of difluoromethane and from 2 to 70% of 3,3,3-trifluoropropene; or from 25 to 70% of difluoromethane, from 2 to 70% of 3,3,3-trifluoropropene and from 5 to 73% of 1,3,3,3-tetrafluoropropene, ideally from 25 to 50% of difluoromethane, from 5 to 70% of 3,3,3-trifluoropropene and from 5 to 55% of 1,3,3,3-tetrafluoropropene; or from 20 to 65% of difluoromethane, from 2 to 70% of 3,3,3-trifluoropropene and from 5 to 78% of 1,3,3,3-tetrafluoropropene, ideally from 25 to 50% of difluoromethane, from 5 to 70% of 3,3,3-trifluoropropene and from 5 to 70% of 1,3,3,3-tetrafluoropropene.

According to another embodiment of said process for reducing environmental impact, the initial heat-transfer fluid is a binary mixture of 50% of difluoromethane and 50% of pentafluoroethane, and the final heat-transfer fluid comprises:

from 60 to 96% of difluoromethane, from 2 to 20% of 1,1-difluoroethane and from 2 to 20% of 3,3,3-trifluoropropene, ideally from 80 to 90% of difluoromethane, from 5 to 15% of 1,1-difluoroethane and from 5 to 15% of 3,3,3-trifluoropropene; or from 50 to 96% of difluoromethane, from 2 to 30% of 1,1-difluoroethane and from 2 to 30% of 3,3,3-trifluoropropene, ideally from 65 to 80% of difluoromethane, from 5 to 25% of 1,1-difluoroethane and from 5 to 30% of 3,3,3-trifluoropropene; or from 2 to 40% of 2,3,3,3-tetrafluoropropene, from 58 to 90% of difluoromethane and from 2 to 40% of 3,3,3-trifluoropropene, ideally from 5 to 30% of 2,3,3,3-tetrafluoropropene, from 65 to 80% of difluoromethane and from 2 to 15% of 3,3,3-trifluoropropene; or from 2 to 30% of 2,3,3,3-tetrafluoropropene, from 60 to 90% of difluoromethane and from 2 to 30% of 3,3,3-trifluoropropene, ideally from 5 to 25% of 2,3,3,3-tetrafluoropropene, from 65 to 80% of difluoromethane and from 5 to 30% of 3,3,3-trifluoropropene; or from 50 to 96% of difluoromethane, from 2 to 50% of 3,3,3-trifluoropropene and from 2 to 50% of 1,3,3,3-tetrafluoropropene, ideally from 65 to 90% of difluoromethane, from 5 to 30% of 3,3,3-trifluoropropene and from 5 to 30% of 1,3,3,3-tetrafluoropropene; or from 50 to 96% of difluoromethane, from 2 to 48% of 3,3,3-trifluoropropene and from 2 to 30% of 1,3,3,3-tetrafluoropropene, ideally from 65 to 90% of difluoromethane, from 5 to 30% of 3,3,3-trifluoropropene and from 5 to 30% of 1,3,3,3-tetrafluoropropene.

According to one embodiment of said process for reducing environmental impact, the initial heat-transfer fluid is 1,1,1,2-tetrafluoroethane, and the final heat-transfer fluid comprises:

from 2 to 20% of difluoromethane, from 2 to 85% of 1,1-difluoroethane and from 2 to 90% of 3,3,3-trifluoropropene, ideally from 5 to 15% of difluoromethane, from 5 to 85% of 1,1-difluoroethane and from 10 to 90% of 3,3,3-trifluoropropene; or from 5 to 75% of 2,3,3,3-tetrafluoropropene, from 2 to 20% of difluoromethane and from 2 to 90% of 3,3,3-trifluoropropene, ideally from 5 to 75% of 2,3,3,3-tetrafluoropropene, from 5 to 15% of difluoromethane and from 10 to 90% of 3,3,3-trifluoropropene; or from 2 to 25% of difluoromethane, from 2 to 90% of 3,3,3-trifluoropropene and from 5 to 96% of 1,3,3,3-tetrafluoropropene, ideally from 5 to 25% of difluoromethane, from 5 to 90% of 3,3,3-trifluoropropene and from 5 to 90% of 1,3,3,3-tetrafluoropropene.

According to another embodiment of said process for reducing environmental impact, the initial heat-transfer fluid is difluoromethane, and the final heat-transfer fluid comprises:

from 2 to 30% of 2,3,3,3-tetrafluoropropene, from 68 to 96% of difluoromethane and from 2 to 20% of 3,3,3-trifluoropropene, ideally from 8 to 23% of 2,3,3,3-tetrafluoropropene, from 75 to 90% of difluoromethane and from 2 to 10% of 3,3,3-trifluoropropene; or from 2 to 40% of 2,3,3,3-tetrafluoropropene, from 58 to 90% of difluoromethane and from 2 to 40% of 3,3,3-trifluoropropene, ideally from 2 to 23% of 2,3,3,3-tetrafluoropropene, from 75 to 90% of difluoromethane and from 2 to 18% of 3,3,3-trifluoropropene.

The present invention makes it possible to overcome the drawbacks of the prior art. It provides more particularly heat-transfer fluids that have a relatively low GWP and that have good energy performance levels, in particular in applications using countercurrent heat exchangers.

This is accomplished by virtue of ternary mixtures comprising HFO-1243zf and HFC-32, the rest making up the mixtures being selected from HFO-152a, HFO-1234yf and HFO-1234ze. These three compounds are hydrocarbon-based molecules which have at least two fluorine substituents and a boiling point of between −30° C. and −18° C. HFC-152a has a boiling point of −24° C., HFO-1234yf has a boiling point of −29° C. and HFO-trans-1234ze has a boiling point of −19° C.

The ternary mixtures above have the particularity of exhibiting good energy performance levels, in particular with countercurrent heat exchangers.

According to some particular embodiments, the invention also has one or preferably more of the advantageous characteristics listed below.

The heat-transfer fluids of the invention have a coefficient of performance which is higher than the reference refrigerants R404a, R407c, HFC-134a, HFC-32 and R410a in applications involving a countercurrent heat exchanger. In certain cases, the capacity of the heat-transfer fluids is greater than or equal to that of the reference refrigerants, in these same applications. Correspondingly, the invention makes it possible to reduce the GWP of existing systems comprising one of the above reference refrigerants, without being detrimental to the performance levels of these systems, and, on the contrary, while improving them to a large extent, by replacing the reference refrigerants with the heat-transfer fluids of the invention.

The heat-transfer fluids of the invention have a coefficient of performance which is higher than that of the HFO-1243zf/HFC-134a/HFC-32 mixture such as is used in document US 2009/0158771.

The heat-transfer fluids of the invention are less inflammable and/or more effective than those used in document WO 2009/150763.

According to the invention, the global warming potential (GWP) is defined relative to carbon dioxide and with respect to a period of 100 years, according to the method indicated in "*The scientific assessment of ozone depletion, 2002, a report of the World Meteorological Association's Global Ozone Research and Monitoring Project*".

DESCRIPTION OF EMBODIMENTS OF THE INVENTION

The invention is now described in greater detail and in a non-limiting manner in the description which follows.

The term "heat-transfer compound", respectively "heat-transfer fluid" (or refrigerant fluid) is intended to mean a compound, respectively a fluid, capable of absorbing heat by evaporating at low temperature and low pressure and of releasing heat by condensing at high temperature and high pressure, in a vapor compression circuit. Generally, a heat-transfer fluid may comprise just one, or two, three or more than three heat-transfer compounds.

The term "heat-transfer composition" is intended to mean a composition comprising a heat-transfer fluid and, optionally, one or more additives which are not heat-transfer compounds for the envisioned application.

The heat transfer process according to the invention is based on the use of equipment comprising a vapor compression circuit which contains a heat-transfer fluid. The heat-transfer process may be a process for heating or cooling a fluid or body.

The vapor compression circuit containing a heat-transfer fluid comprises at least one evaporator, a compressor, a condenser and an expansion valve, and also is for transporting heat-transfer fluid between these components. The evaporator and the condenser comprise a heat exchanger making it possible to exchange heat between the heat-transfer fluid and another fluid or body.

By way of compressor, use may in particular be made of a centrifugal compressor having one or more stages or a centrifugal mini-compressor. Rotary compressors, reciprocating compressors or screw compressors can also be used. The compressor may be driven by an electric motor or by a gas turbine (for example fed with the exhaust gases of a vehicle, for mobile applications), or by gearing.

The equipment may comprise a turbine for generating electricity (Rankine cycle).

The equipment may also optionally comprise at least one coolant circuit used for transmitting heat (with or without a change of state) between the heat-transfer fluid circuit and the fluid or body to be heated or cooled.

The equipment may also optionally comprise two (or more) vapor compression circuits containing identical or distinct heat-transfer fluids. For example, the vapor compression circuits may be coupled together.

The vapor compression circuit operates according to a conventional vapor compression cycle. The cycle comprises the change of state of the heat-transfer fluid from a liquid phase (or liquid/vapor two phase state) to a vapor phase at a relatively low pressure, then the compression of the fluid in the vapor phase up to a relatively high pressure, the change of state (condensation) of the heat-transfer fluid from the vapor phase to the liquid phase at a relatively high pressure, and the reduction of the pressure in order to recommence the cycle.

In the case of a cooling process, heat from the fluid or from the body that is being cooled (directly or indirectly, via a coolant) is absorbed by the heat-transfer fluid, during the evaporation of the latter, at a relatively low temperature compared with the surroundings. The cooling processes include air-conditioning processes (with mobile equipment, for example in vehicles, or stationary equipment), refrigeration processes and freezing processes or cryogenic processes.

In the case of a heating process, heat is imparted (directly or indirectly, via a coolant) from the heat-transfer fluid, during the condensation thereof, to the fluid or the body that is being heated, at a relatively high temperature compared to the surroundings. The equipment that makes it possible to implement the heat transfer is called, in this case, a "heat pump".

It is possible to use any type of heat exchanger for using the heat-transfer fluids according to the invention, and in particular cocurrent heat exchangers.

However, according to a preferred embodiment, the invention provides for the cooling and heating processes, and the corresponding equipment, to comprise a countercurrent heat exchanger, said heat exchanger being countercurrent with respect either to the condenser or to the evaporator. Indeed, the heat-transfer fluids according to the invention are particularly effective with countercurrent heat exchangers. Preferably, both the evaporator and the condenser comprise a countercurrent heat exchanger.

According to the invention, the term "countercurrent heat exchanger" is intended to mean a heat exchanger in which the heat is exchanged between a first fluid and a second fluid, the first fluid at the inlet of the exchanger exchanging heat with the second fluid at the outlet of the exchanger, and the first fluid at the outlet of the exchanger exchanging heat with the second fluid at the inlet of the exchanger.

For example, the countercurrent heat exchangers include devices in which the flow of the first fluid and the flow of the second fluid are in opposite directions or virtually opposite directions. Exchangers which operate in cross-current mode with countercurrent tendency are also included among the countercurrent heat exchangers within the meaning of the present application.

The meaning of the various abbreviations used to denote the various chemical compounds mentioned in the application is the following:

HFC-134a:1,1,1,2-tetrafluoroethane;
HFC-143a:1,1,1-trifluoroethane;

HFC-125: pentafluoroethane;
HFC-32: difluoromethane;
HFC-152a:1,1-difluoroethane;
HFC-41: fluoromethane;
HFO-1234ze: 1,3,3,3-tetrafluoropropene;
HFO-1234yf: 2,3,3,3-tetrafluoropropene;
HFO-1243g: 3,3,3-trifluoropropene.

The heat-transfer fluids used in the invention are the following ternary mixtures:

1) HFC-32, HFC-152a and HFO-1243zf;
2) HFO-1234yf, HFC-32 and HFO-1243zf; and
3) HFC-32, HFO-1243zf and HFO-1234ze.

Compositions 2) and 3) have the advantage of being less inflammable than those described in document WO 2009/150763.

The term "ternary mixture" is intended to mean a composition consisting essentially of the three compounds mentioned, i.e. in which the three compounds mentioned represent at least 99% (preferably at least 99.5% or even at least 99.9%) of the composition.

Unless otherwise mentioned, throughout the application, the proportions of compounds indicated are given as percentages by weight.

The HFO-1234ze may be in cis or trans form or be a mixture of these two forms.

In each of the three compositions above, each compound can be present preferably in an amount of from 1 to 99%, and in particular from 1 to 96%.

For use in low-temperature refrigeration processes, i.e. those in which the temperature of the fluid or of the body cooled is from −40° C. to −10° C., and preferably from −35° C. to −25° C., more particularly preferably from −30° C. to −20° C. (ideally approximately −25° C.), it has been found that the compounds which are most effective as a replacement for R404a or R407c are the following:

for composition 1): from 20 to 70% of HFC-32, from 2 to 30% of HFC-152a and from 2 to 78% of HFO-1243zf, and preferably from 25 to 65% of HFC-32, from 2 to 15% of HFC-152a and from 20 to 78% of HFO-1243zf;

for composition 2): from 5 to 70% of HFO-1234yf, from 20 to 60% of HFC-32 and from 2 to 75% of HFO-1243zf, and preferably from 10 to 70% of HFO-1234yf, from 25 to 50% of HFC-32 and from 2 to 65% of HFO-1243zf; and for composition 3): from 25 to 70% of HFC-32, from 2 to 70% of HFO-1243zf and from 5 to 73% of HFO-1234ze, and preferably from 25 to 50% of HFC-32, from 5 to 70% of HFO-1243zf and from 5 to 55% of HFO-1234ze.

For use in low-temperature refrigeration processes, i.e. those in which the temperature of the fluid or of the body cooled is from −40° C. to −10° C., and preferably from −35° C. to −25° C., more particularly preferably from −30° C. to −20° C. (ideally approximately −25° C.), it has been found that the compositions which are most effective as a replacement for R410a are the following:

for composition 1): from 60 to 96% of HFC-32, from 2 to 20% of HFC-152a and from 2 to 20% of HFO-1243zf, and preferably from 80 to 90% of HFC-32, from 5 to 15% of HFC-152a and from 5 to 15% of HFO-1243zf;

for composition 2): from 2 to 40% of HFO-1234yf, from 58 to 90% of HFC-32 and from 2 to 40% of HFO-1243zf, and preferably from 5 to 30% of HFO-1234yf, from 65 to 80% of HFC-32 and from 2 to 15% of HFO-1243zf; and for composition 3): from 50 to 96% of HFC-32, from 2 to 50% of HFO-1243zf and from 2 to 50% of HFO-1234ze, and preferably from 65 to 90% of HFC-32, from 5 to 30% of HFO-1243zf and from 5 to 30% of HFO-1234ze.

For use in:

moderate-temperature cooling processes, i.e. those in which the temperature of the fluid or the body cooled is from −15° C. to 15° C., preferably from −10° C. to 10° C., more particularly preferably from −5° C. to 5° C. (ideally approximately 0° C.), and also moderate-temperature heating processes, i.e. those in which the temperature of the fluid or of the body heated is from 30° C. to 80° C., and preferably from 35° C. to 55° C., more particularly preferably from 40° C. to 50° C. (ideally approximately 45° C.), it has been found that the compositions which are most effective as a replacement for HFC-134a are the following:

for composition 1): from 2 to 20% of HFC-32, from 2 to 85% of HFC-152a and from 2 to 90% of HFO-1243zf, and preferably from 5 to 15% of HFC-32, from 5 to 85% of HFC-152a and from 10 to 90% of HFO-1243zf;

for composition 2): from 5 to 75% of HFO-1234yf, from 2 to 20% of HFC-32 and from 2 to 90% of HFO-1243zf, and preferably from 5 to 75% of HFO-1234yf, from 5 to 15% of HFC-32 and from 10 to 90% of HFO-1243zf; and for composition 3): from 2 to 25% of HFC-32, from 2 to 90% of HFO-1243zf and from 5 to 96% of HFO-1234ze, and preferably from 5 to 25% of HFC-32, from 5 to 90% of HFO-1243zf and from 5 to 90% of HFO-1234ze.

For use in:

moderate-temperature cooling processes, i.e. those in which the temperature of the fluid or of the body cooled is from −15° C. to 15° C., preferably from −10° C. to 10° C., more particularly preferably from −5° C. to 5° C. (ideally approximately 0° C.), and also moderate-temperature heating processes, i.e. those in which the temperature of the fluid or of the body heated is from 30° C. to 80° C., and preferably from 35° C. to 55° C., more particularly preferably from 40° C. to 50° C. (ideally approximately 45° C.), it has been found that the compositions which are most effective as a replacement for R404a or for R407c are the following:

for composition 1): from 20 to 60% of HFC-32, from 2 to 70% of HFC-152a and from 2 to 70% of HFO-1243zf, and preferably from 25 to 40% of HFC-32, from 5 to 65% of HFC-152a and from 5 to 70% of HFO-1243zf;

for composition 2): from 5 to 80% of HFO-1234yf, from 20 to 50% of HFC-32 and from 2 to 75% of HFO-1243zf, and preferably from 5 to 65% of HFO-1234yf, from 25 to 35% of HFC-32 and from 2 to 70% of HFO-1243zf; and for composition 3): from 20 to 65% of HFC-32, from 2 to 70% of HFO-1243zf and from 5 to 78% of HFO-1234ze, and preferably from 25 to 50% of HFC-32, from 5 to 70% of HFO-1243zf and from 5 to 70% of HFO-1234ze.

For use in:

moderate-temperature cooling processes, i.e. those in which the temperature of the fluid or of the body cooled is from −15° C. to 15° C., preferably from −10° C. to 10° C., more particularly preferably from −5° C. to 5° C. (ideally about 0° C.), and also moderate-temperature heating processes, i.e. those in which the temperature of the fluid or of the body heated is from 30° C. to 80° C., and preferably from 35° C. to 55° C., more particularly preferably from 40° C. to 50° C. (ideally approximately 45° C.), it has been found that the compositions which are most effective as a replacement for R410a are the following:

for composition 1): from 50 to 96% of HFC-32, from 2 to 30% of HFC-152a and from 2 to 30% of HFO-1243zf, and preferably from 65 to 80% of HFC-32, from 5 to 25% of HFC-152a and from 5 to 30% of HFO-1243zf;

from composition 2): from 2 to 30% of HFO-1234yf, from 60 to 90% of HFC-32 and from 2 to 30% of HFO-1243zf, and preferably from 5 to 25% of HFO-1234yf, from 65 to 80% of HFC-32 and from 5 to 30% of HFO-1243zf; and for composition 3): from 50 to 96% of HFC-32, from 2 to 48% of HFO-1243zf and from 2 to 30% of HFO-1234ze, and preferably from 65 to 90% of HFC-32, from 5 to 30% of HFO-1243zf and from 5 to 30% of HFO-1234ze.

For use in low-temperature refrigeration processes, i.e. those in which the temperature of the fluid or of the body cooled is from −40° C. to −10° C., and preferably from −35° C. to −25° C., more particularly preferably from −30° C. to −20° C. (ideally approximately −25° C.), it has been found that the compositions which are most effective as a replacement for HFC-32 are the following:

for composition 2): from 2 to 30% of HFO-1234yf, from 68 to 96% of HFC-32 and from 2 to 20% of HFO-1243zf, and preferably from 8 to 23% of HFO-1234yf, from 75 to 90% of HFC-32 and from 2 to 10% of HFO-1243zf.

For use in:

moderate-temperature cooling processes, i.e. those in which the temperature of the fluid or of the body cooled is from −15° C. to 15° C., preferably from −10° C. to 10° C., more particularly preferably from −5° C. to 5° C. (ideally approximately 0° C.), and also moderate-temperature heating processes, i.e. those in which the temperature of the fluid or of the body heated is from 30° C. to 80° C., and preferably from 35° C. to 55° C., more particularly preferably from 40° C. to 50° C. (ideally approximately 45° C.), it has been found that the compositions which are most effective as a replacement for HFC-32 are the following:

for composition 2): from 2 to 40% of HFO-1234yf, from 58 to 90% of HFC-32 and from 2 to 40% of HFO-1243zf, and preferably from 2 to 23% of HFO-1234yf, from 75 to 90% of HFC-32 and from 2 to 18% of HFO-1243zf.

The above compositions used to replace HFC-32 have the advantage not only of an improved performance level, but also of a lower temperature at the outlet of the compressor, thereby reducing the heat losses, facilitating the compression and reducing the compressive mechanical strains.

In the "low-temperature refrigeration" processes mentioned above, the inlet temperature of the heat-transfer fluid at the evaporator is preferably from −45° C. to −15° C., in particular from −40° C. to −20° C., more particularly preferably from −35° C. to −25° C. and, for example, approximately −30° C.; and the temperature at the beginning of the condensation of the heat-transfer fluid at the condenser is preferably from 25° C. to 80° C., in particular from 30° C. to 60° C., more particularly preferably from 35° C. to 55° C. and, for example, approximately 40° C.

In the "moderate-temperature refrigeration" processes mentioned above, the inlet temperature of the heat-transfer fluid at the evaporator is preferably from −20° C. to 10° C., in particular from −15° C. to 5° C., more particularly preferably from −10° C. to 0° C. and, for example, approximately −5° C.; and the temperature at the beginning of the condensation of the heat-transfer fluid at the condenser is preferably from 25° C. to 80° C., in particular from 30° C. to 60° C., more particularly preferably from 35° C. to 55° C. and, for example, approximately 50° C. These processes may be refrigeration or air-conditioning processes.

In the "moderate-temperature heating" processes mentioned above, the inlet temperature of the heat-transfer fluid at the evaporator is preferably from −20° C. to 10° C., in particular from −15° C. to 5° C., more particularly preferably from −10° C. to 0° C. and, for example, approximately −5° C.; and the temperature at the beginning of the condensation of the heat-transfer fluid at the condenser is preferably from 25° C. to 80° C., in particular from 30° C. to 60° C., more particularly preferably from 35° C. to 55° C. and, for example, approximately 50° C.

In addition, the mixtures having the following formulations are quasi-azeotropic mixtures:

from 75 to 98% of HFC-32, from 1 to 9% of HFC-152a and from 1 to 23% of HFO-1243zf;

from 1 to 28% of HFO-1234yf, from 70 to 98% of HFC-32 and from 1 to 23% of HFO-1243zf;

from 75 to 98% of HFC-32, from 1 to 23% of HFO-1243zf and from 1 to 10% of HFO-1234ze.

For these heat-transfer fluids, at constant temperature, the liquid saturation pressure and the vapor saturation pressure are virtually identical (the maximum pressure difference being 10%). These heat-transfer fluids have an advantage in terms of ease of use. In the absence of significant temperature glide, there is no significant change in the composition circulating, and no significant change either in the composition in the event of a leak. These heat-transfer fluids are particularly suitable for replacing R410a, for example.

The heat-transfer fluids which are not quasi-azeotropic, for their part, are however very effective when they are correctly coupled with a countercurrent heat exchanger (with a temperature difference with the second fluid which is approximately constant in the exchanger).

Each heat-transfer fluid above can be mixed with one or more additives so as to provide the heat transfer composition actually circulating in the vapor compression circuit. The additives can in particular be selected from lubricants, stabilizers, surfactants, tracers, fluorescent agents, odorous agents, solubilizing agents and mixtures thereof.

When it (they) is (are) present, the stabilizer(s) preferably represent(s) at most 5% by weight in the heat-transfer composition. Among the stabilizers, mention may in particular be made of nitromethane, ascorbic acid, terephthalic acid, azoles such as tolutriazole or benzotriazole, phenolic compounds such as tocopherol, hydroquinone, t-butyl hydroquinone, 2,6-di-tert-butyl-4-methylphenol, epoxides (alkyl, optionally fluorinated or perfluorinated, or alkenyl or aromatic) such as n-butyl glycidyl ether, hexanediol diglycidyl ether, allyl diglycidyl ether, butylphenyl glycidyl ether, phosphites, phosphonates, thiols and lactones.

By way of lubricants, use may in particular be made of oils of mineral origin, silicone oils, paraffins, naphthenes, synthetic paraffins, alkylbenzenes, poly-α-olefins, polyalkene glycols, polyol esters and/or polyvinyl ethers.

By way of tracers (capable of being detected), mention may be made of hydrofluorocarbons, deuterated hydrofluorocarbons, deuterated hydrocarbons, perfluorocarbons, fluoroethers, brominated compounds, iodinated compounds, alcohols, aldehydes, ketones, nitrous oxide and combinations thereof. The tracer is different than the heat-transfer compound(s) making up the heat-transfer fluid.

By way of solubilizing agents, mention may be made of hydrocarbons, dimethyl ether, polyoxyalkylene ethers, amides, ketones, nitriles, chlorocarbons, esters, lactones, aryl ethers, fluoroethers and 1,1,1-trifluoroalkanes. The solubilizing agent is different than the heat-transfer compound(s) making up the heat-transfer fluid.

By way of fluorescent agents, mention may be made of naphthalimides, perylenes, coumarins, anthracenes, phenanthracenes, xanthenes, thioxanthenes, naphthoxanthenes, fluoresceins and derivatives and combinations thereof.

By way of odorous agents, mention may be made of alkyl acrylates, allyl acrylates, acrylic acids, acryl esters, alkyl ethers, alkyl esters, alkynes, aldehydes, thiols, thioethers, disulfides, allyl isothiocyanates, alkanoic acids, amines, norbornenes, norbornene derivatives, cyclohexene, aromatic heterocyclic compounds, ascaridole, o-methoxy(methyl)phenol and combinations thereof.

The compositions according to the invention can also be used as an expansion agent, an aerosol or a solvent.

EXAMPLES

The following examples illustrate the invention without limiting it.

Example 1: Method for Calculating the Properties of the Heat-Transfer Fluids in the Various Configurations Envisioned The RK-Soave equation is used for the calculation of the densities, enthalpies, entropies and liquid/vapor equilibrium data of the mixtures. The use of this equation requires knowledge of the properties of the pure substances used in the mixtures in question and also the interaction coefficients for each binary mixture.

The data necessary for each pure substance are the boiling point, the critical temperature and the critical pressure, the pressure curve as a function of the temperature from the boiling point up to the critical point, and the saturated liquid and saturated vapor densities as a function of the temperature.

The data with regard to HFCs are published in the ASHRAE Handbook 2005, chapter 20, and are also available under Refprop (software developed by NIST for the calculation of the properties of refrigerant fluids).

The HFO temperature-pressure curve data are measured by the static method. The critical temperature and the critical pressure are measured using a C80 calorimeter sold by Setaram. The densities, at saturation as a function of the temperature, are measured by means of the vibrating-tube densimeter technology developed by the laboratories of the école de Mines de Paris [French Engineering School].

The RK-Soave equation uses coefficients of binary interaction to represent the behavior of products in mixtures. The coefficients are calculated according to the experimental liquid/vapor equilibrium data.

The technique used for the liquid/vapor equilibrium measurements is the static analytical cell method. The equilibrium cell comprises a sapphire tube and is equipped with two Rolsitm electromagnetic samplers. It is immersed in a cryo-thermostat bath (Huber HS40). Magnetic stirring driven by a magnetic field rotating at a variable speed is used to accelerate the reaching of the equilibria. The sample analysis is carried out by gas chromatography (HP5890 series II) using a katharometer (TCD).

Liquid/vapor equilibrium measurements on the binary mixture HFC-32/HFO-1234ze are carried out for the following isotherm: 15° C.

The liquid/vapor equilibrium measurements on the binary mixture HFC-32/HFO-1234yf are carried out for the following isotherms: 70° C., 30° C., −10° C.

The liquid/vapor equilibrium data for the binary HFC-152a/HFO-32 are available under Refprop. Two isotherms (−20° C. and 20° C.) and two isobars (1 bar and 25 bar) are used for the calculation of the interaction coefficients for this binary mixture.

The liquid/vapor equilibrium measurements on the binary mixture HFC-32/HFO-1243zf are carried out for the following isotherms: −15° C. and 0° C.

The liquid/vapor equilibrium measurements on the binary mixture HFO-1234yf/HFO-1243zf are carried out for the following isotherm: 21.3° C.

A compression system equipped with a countercurrent evaporator and condenser, with a screw compressor and with an expansion valve is considered.

The system operates with 15° C. of overheat and 5° C. of undercooling. The minimum temperature difference between the secondary fluid and the refrigerant fluid is considered to be about 5° C.

The isentropic efficiency of the compressors depends on the compression ratio. This efficiency is calculated according to the following equation:

$$\eta_{isen} = a - b(\tau - c)^2 - \frac{d}{\tau - e} \quad (1)$$

For a screw compressor, the constants a, b, c, d and e of the isentropic efficiency equation (1) are calculated according to the standard data published in the "Handbook of air conditioning and refrigeration", page 11.52.

The coefficient of performance (COP) is defined as being the useful power supplied by the system over the power provided or consumed by the system.

The Lorenz coefficient of performance (COPLorenz) is a reference coefficient of performance. It depends on temperatures and is used to compare the COPs of the various fluids.

The Lorenz coefficient of performance is defined as follows (the temperatures T are in K):

$$T_{average}^{condenser} = T_{inlet}^{condenser} - T_{outlet}^{condenser} \quad (2)$$

$$T_{average}^{evaporator} = T_{outlet}^{evaporator} - T_{inlet}^{evaporator} \quad (3)$$

The Lorenz COP in the case of conditioned air and of refrigeration is:

$$COPlorenz = \frac{T_{average}^{evaporator}}{T_{average}^{condenser} - T_{average}^{evaporator}} \quad (4)$$

The Lorenz COP in the case of heating is:

$$COPlorenz = \frac{T_{average}^{condenser}}{T_{average}^{condenser} - T_{average}^{evaporator}} \quad (5)$$

For each composition, the coefficient of performance of the Lorenz cycle is calculated as a function of the corresponding temperatures.

In low-temperature refrigeration mode, the compression system operates between an inlet temperature of the refrigerant fluid at the evaporator of −30° C. and a temperature at the beginning of the condensation of the refrigerant fluid at the condenser of 40° C. The system provides refrigeration at −25° C.

In moderate-temperature heating mode, the compression system operates between an inlet temperature of the refrigerant fluid at the evaporator of −5° C. and a temperature at the beginning of the condensation of the refrigerant fluid at the condenser of 50° C. The system supplies heat at 45° C.

In moderate-temperature cooling mode, the compression system operates between an inlet temperature of the refrigerant fluid at the evaporator of −5° C. and a temperature at the beginning of the condensation of the refrigerant fluid at the condenser of 50° C. The system provides refrigeration at 0° C.

In the tables that follow, "Temp. evap outlet" denotes the temperature of the fluid at the outlet of the evaporator, "Temp. comp outlet" denotes the temperature of the fluid at the outlet of the compressor, "T cond outlet" denotes the temperature of the fluid at the outlet of the condenser, "evap P" denotes the pressure of the fluid in the evaporator, "cond P" denotes the pressure of the fluid in the condenser, "Ratio (w/w)" denotes the compression ratio, "Glide" denotes the temperature glide, "comp efficiency" denotes the efficiency of the compressor, "% CAP" denotes the volumetric capacity of the fluid relative to the reference fluid indicated on the first line, "% COP/COPLorenz" denotes the ratio of the COP of the system relative to the COP of the corresponding Lorenz cycle, "Psat liquid" denotes the liquid saturation pressure, "Psat vapor" denotes the vapor saturation pressure, and "% diff in pressure" denotes the difference between these two pressures, expressed as a percentage.

Example 2: Results for a Low-Temperature Refrigeration, Comparison with R404a and R407c HFC-32/HFC-152a/HFO-1243zf mixture:

| Composition (%) | | | Temp evap outlet (° C.) | Temp comp outlet (° C.) | T cond outlet (° C.) | evap P (bar) | cond P (bar) | Ratio (w/w) | Glide | comp efficiency | % CAP | % COP/COPLorenz |
|---|---|---|---|---|---|---|---|---|---|---|---|---|
| R404A | | | −30 | 101 | 40 | 2.1 | 18.1 | 8.8 | 0.46 | 53.8 | 100 | 32 |
| R407C | | | −26 | 131 | 35 | 1.7 | 15.3 | 9.0 | 4.48 | 51.9 | 108 | 35 |
| HFC-32 | HFC-152a | HFO-1243zf | | | | | | | | | | |
| 25 | 10 | 65 | −25 | 122 | 31 | 1.4 | 12.4 | 8.6 | 4.96 | 55.1 | 95 | 38 |
| 35 | 30 | 35 | −25 | 151 | 31 | 1.5 | 13.8 | 9.1 | 5.03 | 51.5 | 106 | 36 |
| 35 | 20 | 45 | −25 | 140 | 31 | 1.6 | 14.0 | 8.8 | 5.25 | 54.1 | 108 | 38 |
| 35 | 10 | 55 | −24 | 128 | 31 | 1.7 | 14.1 | 8.4 | 5.57 | 57.1 | 111 | 40 |
| 50 | 25 | 25 | −25 | 164 | 33 | 1.8 | 16.3 | 8.9 | 5.35 | 52.5 | 125 | 36 |
| 50 | 15 | 35 | −25 | 152 | 33 | 1.9 | 16.6 | 8.6 | 5.24 | 54.9 | 127 | 38 |
| 50 | 5 | 45 | −25 | 139 | 33 | 2.0 | 16.9 | 8.3 | 5.19 | 57.8 | 131 | 40 |
| 65 | 10 | 25 | −26 | 171 | 36 | 2.2 | 19.4 | 8.8 | 4.22 | 53.6 | 143 | 36 |

HFO-1234yf/HFC-32/HFO-1243zf mixture:

| Composition (%) | | | Temp evap outlet (° C.) | Temp comp outlet (° C.) | T cond outlet (° C.) | evap P (bar) | cond P (bar) | Ratio (w/w) | Glide | comp efficiency | % CAP | % COP/COPLorenz |
|---|---|---|---|---|---|---|---|---|---|---|---|---|
| R404A | | | −30 | 101 | 40 | 2.1 | 18.1 | 8.8 | 0.46 | 53.8 | 100 | 32 |
| R407C | | | −26 | 131 | 35 | 1.7 | 15.3 | 9.0 | 4.48 | 51.9 | 108 | 35 |
| HFO-1234yf | HFC-32 | HFO-1243zf | | | | | | | | | | |
| 70 | 25 | 5 | −25 | 103 | 32 | 1.8 | 14.7 | 8.1 | 5.20 | 59.2 | 109 | 40 |
| 60 | 25 | 15 | −25 | 104 | 32 | 1.8 | 14.4 | 8.1 | 5.33 | 59.1 | 108 | 40 |
| 50 | 25 | 25 | −25 | 105 | 31 | 1.7 | 14.0 | 8.1 | 5.49 | 59.2 | 108 | 41 |
| 40 | 25 | 35 | −24 | 105 | 31 | 1.7 | 13.7 | 8.1 | 5.62 | 59.4 | 107 | 41 |
| 30 | 25 | 45 | −24 | 106 | 31 | 1.7 | 13.3 | 8.1 | 5.68 | 59.4 | 105 | 42 |
| 20 | 25 | 55 | −24 | 107 | 30 | 1.6 | 13.0 | 8.1 | 5.65 | 59.3 | 103 | 42 |
| 10 | 25 | 65 | −24 | 108 | 30 | 1.6 | 12.7 | 8.1 | 5.56 | 59.0 | 100 | 41 |
| 60 | 35 | 5 | −25 | 112 | 34 | 2.1 | 16.6 | 8.1 | 4.98 | 59.6 | 123 | 40 |
| 50 | 35 | 15 | −25 | 114 | 33 | 2.0 | 16.3 | 8.1 | 5.24 | 59.6 | 123 | 41 |
| 40 | 35 | 25 | −24 | 114 | 32 | 2.0 | 15.8 | 8.0 | 5.50 | 59.9 | 122 | 41 |
| 30 | 35 | 35 | −24 | 114 | 32 | 1.9 | 15.4 | 8.0 | 5.71 | 60.2 | 121 | 42 |
| 20 | 35 | 45 | −24 | 114 | 31 | 1.9 | 14.9 | 7.9 | 5.85 | 60.5 | 119 | 42 |
| 10 | 35 | 55 | −24 | 115 | 31 | 1.8 | 14.5 | 7.9 | 5.90 | 60.5 | 117 | 42 |
| 45 | 50 | 5 | −26 | 132 | 36 | 2.3 | 19.4 | 8.3 | 3.54 | 57.8 | 139 | 38 |
| 35 | 50 | 15 | −26 | 134 | 35 | 2.3 | 18.9 | 8.3 | 3.96 | 57.8 | 138 | 39 |
| 25 | 50 | 25 | −26 | 134 | 35 | 2.2 | 18.4 | 8.2 | 4.35 | 58.2 | 137 | 39 |
| 15 | 50 | 35 | −25 | 133 | 34 | 2.2 | 17.8 | 8.2 | 4.67 | 58.6 | 136 | 40 |
| 5 | 50 | 45 | −25 | 133 | 33 | 2.1 | 17.2 | 8.1 | 4.92 | 59.2 | 134 | 41 |

HFC-32/HFO-1243zf/HFO-1234ze mixture:

| Composition (%) | | | Temp evap outlet (° C.) | Temp comp outlet (° C.) | T cond outlet (° C.) | evap P (bar) | cond P (bar) | Ratio (w/w) | Glide | comp efficiency | % CAP | % COP/COPLorenz |
|---|---|---|---|---|---|---|---|---|---|---|---|---|
| R404A | | | −30 | 101 | 40 | 2.1 | 18.1 | 8.8 | 0.46 | 53.8 | 100 | 32 |
| R407C | | | −26 | 131 | 35 | 1.7 | 15.3 | 9.0 | 4.48 | 51.9 | 108 | 35 |
| HFC-32 | HFO-1243zf | HFO-1234ze | | | | | | | | | | |
| 25 | 70 | 5 | −24 | 111 | 30 | 1.5 | 12.4 | 8.2 | 5.58 | 58.2 | 97 | 41 |
| 25 | 60 | 15 | −24 | 112 | 30 | 1.5 | 12.3 | 8.3 | 5.86 | 57.5 | 97 | 41 |
| 25 | 50 | 25 | −24 | 113 | 31 | 1.5 | 12.2 | 8.4 | 6.09 | 57.1 | 96 | 40 |
| 35 | 60 | 5 | −24 | 117 | 30 | 1.8 | 14.1 | 8.0 | 6.03 | 60.1 | 114 | 42 |
| 35 | 50 | 15 | −24 | 118 | 31 | 1.7 | 14.0 | 8.0 | 6.34 | 59.7 | 113 | 42 |
| 35 | 40 | 25 | −23 | 117 | 31 | 1.7 | 13.7 | 8.0 | 6.64 | 59.7 | 112 | 42 |
| 35 | 30 | 35 | −23 | 117 | 30 | 1.7 | 13.5 | 8.0 | 6.95 | 59.8 | 111 | 42 |
| 35 | 20 | 45 | −23 | 118 | 30 | 1.7 | 13.3 | 8.1 | 7.28 | 59.6 | 110 | 42 |
| 35 | 10 | 55 | −22 | 119 | 31 | 1.6 | 13.2 | 8.1 | 7.66 | 59.1 | 109 | 42 |
| 50 | 45 | 5 | −25 | 133 | 33 | 2.1 | 16.9 | 8.1 | 5.26 | 59.2 | 133 | 41 |
| 50 | 35 | 15 | −24 | 132 | 32 | 2.1 | 16.5 | 8.0 | 5.77 | 59.7 | 133 | 42 |
| 50 | 25 | 25 | −24 | 131 | 32 | 2.0 | 16.1 | 8.0 | 6.28 | 60.4 | 132 | 42 |
| 50 | 15 | 35 | −23 | 130 | 31 | 2.0 | 15.8 | 7.9 | 6.78 | 60.7 | 132 | 43 |
| 50 | 5 | 45 | −23 | 132 | 32 | 2.0 | 15.8 | 8.0 | 7.23 | 60.3 | 131 | 42 |

Example 3: Results for a Low-Temperature Refrigeration, Comparison with R410a

HFC-32/HFC-152a/HFO-1243zf mixture:

| Composition (%) | | | Temp evap outlet (° C.) | Temp comp outlet (° C.) | T cond outlet (° C.) | evap P (bar) | cond P (bar) | Ratio (w/w) | Glide | comp efficiency | % CAP | % COP/COPLorenz |
|---|---|---|---|---|---|---|---|---|---|---|---|---|
| R410A | | | −30 | 153 | 40 | 2.7 | 24.2 | 8.9 | 0.06 | 52.5 | 100 | 33 |
| HFC-32 | HFC-152a | HFO-1243zf | | | | | | | | | | |
| 80 | 15 | 5 | −26 | 202 | 38 | 2.3 | 21.4 | 9.1 | 3.99 | 50.8 | 102 | 34 |
| 80 | 5 | 15 | −27 | 192 | 38 | 2.5 | 22.2 | 9.0 | 2.52 | 52.1 | 103 | 34 |
| 90 | 5 | 5 | −28 | 207 | 39 | 2.6 | 23.4 | 9.1 | 1.88 | 51.4 | 108 | 34 |

HFO-1234yf/HFC-32/HFO-1243zf mixture:

| Composition (%) | | | Temp evap outlet (° C.) | Temp comp outlet (° C.) | T cond outlet (° C.) | evap P (bar) | cond P (bar) | Ratio (w/w) | Glide | comp efficiency | % CAP | % COP/COPLorenz |
|---|---|---|---|---|---|---|---|---|---|---|---|---|
| R410A | | | −30 | 153 | 40 | 2.7 | 24.2 | 8.9 | 0.06 | 52.5 | 100 | 33 |
| HFO-1234yf | HFC-32 | HFO-1243zf | | | | | | | | | | |
| 30 | 65 | 5 | −28 | 156 | 38 | 2.5 | 21.6 | 8.6 | 1.87 | 55.4 | 99 | 37 |
| 20 | 65 | 15 | −28 | 158 | 37 | 2.5 | 21.2 | 8.6 | 2.37 | 55.2 | 98 | 36 |
| 15 | 80 | 5 | −29 | 182 | 39 | 2.6 | 23.3 | 8.8 | 0.71 | 53.3 | 106 | 35 |
| 5 | 80 | 15 | −29 | 185 | 39 | 2.6 | 22.9 | 8.9 | 1.25 | 52.8 | 104 | 35 |

HFC-32/HFO-1243zf/HFO-1234ze mixture:

| Composition (%) | | | Temp evap outlet (° C.) | Temp comp outlet (° C.) | T cond outlet (° C.) | evap P (bar) | cond P (bar) | Ratio (w/w) | Glide | comp efficiency | % CAP | % COP/COPLorenz |
|---|---|---|---|---|---|---|---|---|---|---|---|---|
| R410A | | | −30 | 153 | 40 | 2.7 | 24.2 | 8.9 | 0.06 | 52.5 | 100 | 33 |
| HFC-32 | HFO-1243zf | HFO-1234ze | | | | | | | | | | |
| 65 | 30 | 5 | −26 | 156 | 35 | 2.3 | 19.7 | 8.5 | 3.70 | 56.5 | 97 | 38 |
| 65 | 20 | 15 | −26 | 153 | 35 | 2.3 | 19.1 | 8.3 | 4.50 | 57.9 | 97 | 40 |
| 65 | 10 | 25 | −25 | 151 | 34 | 2.3 | 18.6 | 6.2 | 5.21 | 58.8 | 97 | 41 |

-continued

| Composition (%) | | | Temp evap outlet (° C.) | Temp comp outlet (° C.) | T cond outlet (° C.) | evap P (bar) | cond P (bar) | Ratio (w/w) | Glide | comp efficiency | % CAP | % COP/COPLorenz |
|---|---|---|---|---|---|---|---|---|---|---|---|---|
| 80 | 15 | 5 | −28 | 183 | 38 | 2.5 | 22.2 | 8.8 | 2.06 | 53.8 | 104 | 36 |
| 80 | 5 | 15 | −27 | 178 | 37 | 2.5 | 21.5 | 8.6 | 2.99 | 55.3 | 105 | 37 |
| 90 | 5 | 5 | −29 | 199 | 39 | 2.6 | 23.5 | 8.9 | 1.12 | 52.6 | 109 | 35 |

Example 4: Results for a Moderate-Temperature Cooling, Comparison with HFC-134a

HFC-32/HFC-152a/HFO-1243zf mixture:

| Composition (%) | | | Temp evap outlet (° C.) | Temp comp outlet (° C.) | T cond outlet (° C.) | evap P (bar) | cond P (bar) | Ratio (w/w) | Glide | comp efficiency | % CAP | % COP/COPLorenz |
|---|---|---|---|---|---|---|---|---|---|---|---|---|
| R134a | | | −5 | 81 | 50 | 2.4 | 13.2 | 5.4 | 0.00 | 75.9 | 100 | 54 |
| HFC-32 | HFC-152a | HFO-1243zf | | | | | | | | | | |
| 5 | 5 | 90 | −3 | 75 | 47 | 2.6 | 12.3 | 4.7 | 1.82 | 78.9 | 104 | 57 |
| 5 | 15 | 80 | −3 | 78 | 47 | 2.6 | 12.5 | 4.8 | 1.65 | 78.5 | 106 | 57 |
| 5 | 25 | 70 | −3 | 81 | 47 | 2.6 | 12.6 | 4.9 | 1.54 | 78.2 | 107 | 57 |
| 5 | 35 | 60 | −4 | 84 | 47 | 2.6 | 12.7 | 4.9 | 1.46 | 78.0 | 109 | 58 |
| 5 | 45 | 50 | −4 | 86 | 47 | 2.6 | 12.7 | 5.0 | 1.38 | 77.7 | 110 | 58 |
| 5 | 55 | 40 | −4 | 89 | 48 | 2.5 | 12.7 | 5.0 | 1.31 | 77.6 | 110 | 58 |
| 5 | 65 | 30 | −4 | 91 | 48 | 2.5 | 12.7 | 5.1 | 1.22 | 77.4 | 110 | 58 |
| 5 | 75 | 20 | −4 | 93 | 48 | 2.5 | 12.6 | 5.1 | 1.11 | 77.2 | 110 | 58 |
| 5 | 85 | 10 | −4 | 95 | 48 | 2.4 | 12.5 | 5.2 | 0.97 | 76.9 | 109 | 58 |
| 15 | 5 | 80 | 0 | 79 | 42 | 3.3 | 14.0 | 4.2 | 4.79 | 80.4 | 135 | 59 |
| 15 | 15 | 70 | −1 | 82 | 43 | 3.3 | 14.1 | 4.3 | 4.31 | 80.0 | 135 | 58 |
| 15 | 25 | 60 | −1 | 85 | 43 | 3.2 | 14.2 | 4.4 | 4.02 | 79.7 | 135 | 59 |
| 15 | 35 | 50 | −1 | 87 | 44 | 3.1 | 14.2 | 4.5 | 3.81 | 79.4 | 135 | 59 |
| 15 | 45 | 40 | −1 | 90 | 44 | 3.1 | 14.2 | 4.6 | 3.64 | 79.2 | 136 | 59 |
| 15 | 55 | 30 | −2 | 93 | 44 | 3.0 | 14.1 | 4.7 | 3.47 | 78.9 | 135 | 60 |
| 15 | 65 | 20 | −2 | 95 | 44 | 2.9 | 14.0 | 4.8 | 3.27 | 78.6 | 134 | 60 |
| 15 | 75 | 10 | −2 | 98 | 44 | 2.8 | 13.8 | 4.9 | 3.02 | 78.3 | 133 | 60 |

HFO-1234yf/HFC-32/HFO-1243zf mixture:

| Composition (%) | | | Temp evap outlet (° C.) | Temp comp outlet (° C.) | T cond outlet (° C.) | evap P (bar) | cond P (bar) | Ratio (w/w) | Glide | comp efficiency | % CAP | % COP/COPLorenz |
|---|---|---|---|---|---|---|---|---|---|---|---|---|
| R134a | | | −5 | 81 | 50 | 2.4 | 13.2 | 5.4 | 0.00 | 75.9 | 100 | 54 |
| HFO-1234yf | HFC-32 | HFO-1243zf | | | | | | | | | | |
| 5 | 5 | 90 | −3 | 73 | 46 | 2.6 | 12.2 | 4.6 | 1.93 | 79.1 | 104 | 57 |
| 15 | 5 | 80 | −3 | 72 | 46 | 2.7 | 12.4 | 4.6 | 1.92 | 79.2 | 105 | 57 |
| 25 | 5 | 70 | −3 | 72 | 46 | 2.7 | 12.6 | 4.6 | 1.92 | 79.2 | 106 | 56 |
| 35 | 5 | 60 | −3 | 72 | 46 | 2.8 | 12.8 | 4.6 | 1.94 | 79.2 | 107 | 56 |
| 45 | 5 | 50 | −3 | 71 | 46 | 2.8 | 13.0 | 4.6 | 1.97 | 79.2 | 108 | 56 |
| 55 | 5 | 40 | −3 | 71 | 46 | 2.9 | 13.2 | 4.6 | 1.99 | 79.2 | 109 | 55 |
| 65 | 5 | 30 | −3 | 71 | 46 | 2.9 | 13.5 | 4.6 | 2.00 | 79.2 | 110 | 55 |
| 5 | 15 | 80 | 0 | 77 | 42 | 3.4 | 14.0 | 4.1 | 5.12 | 80.7 | 137 | 59 |
| 15 | 15 | 70 | 0 | 76 | 42 | 3.5 | 14.3 | 4.1 | 5.07 | 80.7 | 139 | 59 |
| 25 | 15 | 60 | 0 | 76 | 42 | 3.6 | 14.6 | 4.1 | 5.07 | 80.7 | 141 | 59 |
| 35 | 15 | 50 | 0 | 76 | 42 | 3.6 | 14.9 | 4.1 | 5.08 | 80.7 | 143 | 58 |
| 45 | 15 | 40 | 0 | 76 | 42 | 3.7 | 15.2 | 4.1 | 5.07 | 80.6 | 145 | 58 |
| 55 | 15 | 30 | 0 | 75 | 42 | 3.8 | 15.6 | 4.1 | 5.02 | 80.6 | 146 | 57 |
| 65 | 15 | 20 | 0 | 75 | 42 | 3.8 | 15.9 | 4.1 | 4.93 | 80.6 | 147 | 57 |
| 75 | 15 | 10 | 0 | 75 | 43 | 3.9 | 16.2 | 4.1 | 4.82 | 80.6 | 148 | 56 |

HFC-32/HFO-1243zf/HFO-1234ze mixture:

| Composition (%) | | | Temp evap outlet (° C.) | Temp comp outlet (° C.) | T cond outlet (° C.) | evap P (bar) | cond P (bar) | Ratio (w/w) | Glide | comp efficiency | % CAP | % COP/ COPLorenz |
|---|---|---|---|---|---|---|---|---|---|---|---|---|
| HFC-134a | | | −5 | 81 | 50 | 2.4 | 13.2 | 5.4 | 0.00 | 75.9 | 100 | 54 |
| HFC-32 | HFO-1243zf | HFO-1234ze | | | | | | | | | | |
| 5 | 90 | 5 | −3 | 74 | 46 | 2.6 | 12.1 | 4.6 | 2.04 | 79.0 | 103 | 57 |
| 5 | 80 | 15 | −3 | 74 | 46 | 2.6 | 12.1 | 4.7 | 2.18 | 78.9 | 103 | 57 |
| 5 | 70 | 25 | −3 | 74 | 46 | 2.5 | 12.0 | 4.7 | 2.28 | 78.7 | 102 | 57 |
| 5 | 60 | 35 | −3 | 74 | 46 | 2.5 | 11.9 | 4.8 | 2.34 | 78.5 | 101 | 57 |
| 5 | 50 | 45 | −3 | 74 | 46 | 2.4 | 11.8 | 4.8 | 2.40 | 78.4 | 100 | 57 |
| 5 | 40 | 55 | −3 | 74 | 46 | 2.4 | 11.6 | 4.9 | 2.45 | 78.2 | 98 | 56 |
| 15 | 80 | 5 | 0 | 77 | 42 | 3.4 | 13.9 | 4.1 | 5.30 | 80.6 | 137 | 59 |
| 15 | 70 | 15 | 0 | 78 | 42 | 3.3 | 13.9 | 4.2 | 5.48 | 80.5 | 138 | 60 |
| 15 | 60 | 25 | 1 | 78 | 42 | 3.3 | 13.8 | 4.2 | 5.57 | 80.4 | 137 | 60 |
| 15 | 50 | 35 | 1 | 78 | 43 | 3.2 | 13.7 | 4.2 | 5.62 | 80.4 | 135 | 60 |
| 15 | 40 | 45 | 1 | 78 | 43 | 3.2 | 13.5 | 4.2 | 5.66 | 80.3 | 133 | 60 |
| 15 | 30 | 55 | 1 | 78 | 43 | 3.1 | 13.3 | 4.3 | 5.73 | 80.2 | 131 | 59 |
| 15 | 20 | 65 | 1 | 79 | 43 | 3.1 | 13.2 | 4.3 | 5.84 | 80.1 | 129 | 59 |
| 15 | 10 | 75 | 1 | 79 | 43 | 3.0 | 13.1 | 4.4 | 6.01 | 80.0 | 128 | 59 |

Example 5: Results for a Moderate-Temperature Heating, Comparison with HFC-134a

HFC-32/HFC-152a/HFO-1243zf mixture:

| Composition (%) | | | Temp evap outlet (° C.) | Temp comp outlet (° C.) | T cond outlet (° C.) | evap P (bar) | cond P (bar) | Ratio (w/w) | Glide | comp efficiency | % CAPc | % COPc/ COPLorenz |
|---|---|---|---|---|---|---|---|---|---|---|---|---|
| R134a | | | −5 | 81 | 50 | 2.4 | 13.2 | 5.4 | 0.00 | 75.9 | 100 | 63 |
| HFC-32 | HFC-152a | HFO-1243zf | | | | | | | | | | |
| 5 | 5 | 90 | −3 | 75 | 47 | 2.6 | 12.3 | 4.7 | 1.82 | 78.9 | 102 | 66 |
| 5 | 15 | 80 | −3 | 78 | 47 | 2.6 | 12.5 | 4.8 | 1.65 | 78.5 | 104 | 66 |
| 5 | 25 | 70 | −3 | 81 | 47 | 2.6 | 12.6 | 4.9 | 1.54 | 78.2 | 105 | 66 |
| 5 | 35 | 60 | −4 | 84 | 47 | 2.6 | 12.7 | 4.9 | 1.46 | 78.0 | 106 | 66 |
| 5 | 45 | 50 | −4 | 86 | 47 | 2.6 | 12.7 | 5.0 | 1.38 | 77.7 | 107 | 66 |
| 5 | 55 | 40 | −4 | 89 | 48 | 2.5 | 12.7 | 5.0 | 1.31 | 77.6 | 107 | 66 |
| 5 | 65 | 30 | −4 | 91 | 48 | 2.5 | 12.7 | 5.1 | 1.22 | 77.4 | 107 | 66 |
| 5 | 75 | 20 | −4 | 93 | 48 | 2.5 | 12.6 | 5.1 | 1.11 | 77.2 | 106 | 66 |
| 5 | 85 | 10 | −4 | 95 | 48 | 2.4 | 12.5 | 5.2 | 0.97 | 76.9 | 106 | 66 |
| 15 | 5 | 80 | 0 | 79 | 42 | 3.3 | 14.0 | 4.2 | 4.79 | 80.4 | 129 | 67 |
| 15 | 15 | 70 | −1 | 82 | 43 | 3.3 | 14.1 | 4.3 | 4.31 | 80.0 | 129 | 67 |
| 15 | 25 | 60 | −1 | 85 | 43 | 3.2 | 14.2 | 4.4 | 4.02 | 79.7 | 129 | 67 |
| 15 | 35 | 50 | −1 | 87 | 44 | 3.1 | 14.2 | 4.5 | 3.81 | 79.4 | 129 | 67 |
| 15 | 45 | 40 | −1 | 90 | 44 | 3.1 | 14.2 | 4.6 | 3.64 | 79.2 | 129 | 67 |
| 15 | 55 | 30 | −2 | 93 | 44 | 3.0 | 14.1 | 4.7 | 3.47 | 78.9 | 128 | 67 |
| 15 | 65 | 20 | −2 | 95 | 44 | 2.9 | 14.0 | 4.8 | 3.27 | 78.6 | 127 | 67 |
| 15 | 75 | 10 | −2 | 98 | 44 | 2.8 | 13.8 | 4.9 | 3.02 | 78.3 | 126 | 67 |

HFO-1234yf/HFC-32/HFO-1243zf mixture:

| Composition (%) | | | Temp evap outlet (° C.) | Temp comp outlet (° C.) | T cond outlet (° C.) | evap P (bar) | cond P (bar) | Ratio (w/w) | Glide | comp efficiency | % CAP | % COP/ COPLorenz |
|---|---|---|---|---|---|---|---|---|---|---|---|---|
| R134a | | | −5 | 81 | 50 | 2.4 | 13.2 | 5.4 | 0.00 | 75.9 | 100 | 63 |
| HFO-1234yf | HFC-32 | HFO-1243zf | | | | | | | | | | |
| 5 | 5 | 90 | −3 | 73 | 46 | 2.6 | 12.2 | 4.6 | 1.93 | 79.1 | 102 | 66 |
| 15 | 5 | 80 | −3 | 72 | 46 | 2.7 | 12.4 | 4.6 | 1.92 | 79.2 | 102 | 65 |
| 25 | 5 | 70 | −3 | 72 | 46 | 2.7 | 12.6 | 4.6 | 1.92 | 79.2 | 103 | 65 |
| 35 | 5 | 60 | −3 | 72 | 46 | 2.8 | 12.8 | 4.6 | 1.94 | 79.2 | 104 | 64 |
| 45 | 5 | 50 | −3 | 71 | 46 | 2.8 | 13.0 | 4.6 | 1.97 | 79.2 | 105 | 64 |
| 55 | 5 | 40 | −3 | 71 | 46 | 2.9 | 13.2 | 4.6 | 1.99 | 79.2 | 107 | 64 |
| 65 | 5 | 30 | −3 | 71 | 46 | 2.9 | 13.5 | 4.6 | 2.00 | 79.2 | 108 | 64 |
| 75 | 5 | 20 | −3 | 70 | 46 | 3.0 | 13.7 | 4.6 | 1.97 | 79.2 | 109 | 64 |

-continued

| Composition (%) | | | Temp evap outlet (° C.) | Temp comp outlet (° C.) | T cond outlet (° C.) | evap P (bar) | cond P (bar) | Ratio (w/w) | Glide | comp efficiency | % CAP | % COP/COPLorenz |
|---|---|---|---|---|---|---|---|---|---|---|---|---|
| 5  | 15 | 80 | 0 | 77 | 42 | 3.4 | 14.0 | 4.1 | 5.12 | 80.7 | 131 | 67 |
| 15 | 15 | 70 | 0 | 76 | 42 | 3.5 | 14.3 | 4.1 | 5.07 | 80.7 | 133 | 67 |
| 25 | 15 | 60 | 0 | 76 | 42 | 3.6 | 14.6 | 4.1 | 5.07 | 80.7 | 135 | 67 |
| 35 | 15 | 50 | 0 | 76 | 42 | 3.6 | 14.9 | 4.1 | 5.08 | 80.7 | 137 | 67 |
| 45 | 15 | 40 | 0 | 76 | 42 | 3.7 | 15.2 | 4.1 | 5.07 | 80.6 | 139 | 66 |
| 55 | 15 | 30 | 0 | 75 | 42 | 3.8 | 15.6 | 4.1 | 5.02 | 80.6 | 140 | 66 |
| 65 | 15 | 20 | 0 | 75 | 42 | 3.8 | 15.9 | 4.1 | 4.93 | 80.6 | 141 | 65 |
| 75 | 15 | 10 | 0 | 75 | 43 | 3.9 | 16.2 | 4.1 | 4.82 | 80.6 | 142 | 64 |

HFC-32/HFO-1243zf/HFO-1234ze mixture:

| Composition (%) | | | Temp evap outlet (° C.) | Temp comp outlet (° C.) | T cond outlet (° C.) | evap P (bar) | cond P (bar) | Ratio (w/w) | Glide | comp efficiency | % CAP | % COPc/COPLorenz |
|---|---|---|---|---|---|---|---|---|---|---|---|---|
| HFC-134a | | | −5 | 81 | 50 | 2.4 | 13.2 | 5.4 | 0.00 | 75.9 | 100 | 63 |
| HFC-32 | HFC-1243zf | HFO-1234ze | | | | | | | | | | |
| 5  | 90 | 5  | −3 | 74 | 46 | 2.6 | 12.1 | 4.6 | 2.04 | 79.0 | 101 | 66 |
| 5  | 80 | 15 | −3 | 74 | 46 | 2.6 | 12.1 | 4.7 | 2.18 | 78.9 | 101 | 66 |
| 5  | 70 | 25 | −3 | 74 | 46 | 2.5 | 12.0 | 4.7 | 2.28 | 78.7 | 100 | 66 |
| 5  | 60 | 35 | −3 | 74 | 46 | 2.5 | 11.9 | 4.8 | 2.34 | 78.5 | 99  | 66 |
| 15 | 80 | 5  | 0  | 77 | 42 | 3.4 | 13.9 | 4.1 | 5.30 | 80.6 | 130 | 67 |
| 15 | 70 | 15 | 0  | 78 | 42 | 3.3 | 13.9 | 4.2 | 5.48 | 80.5 | 130 | 67 |
| 15 | 60 | 25 | 1  | 78 | 42 | 3.3 | 13.8 | 4.2 | 5.57 | 80.4 | 130 | 68 |
| 15 | 50 | 35 | 1  | 78 | 43 | 3.2 | 13.7 | 4.2 | 5.62 | 80.4 | 128 | 68 |
| 15 | 40 | 45 | 1  | 78 | 43 | 3.2 | 13.5 | 4.2 | 5.66 | 80.3 | 126 | 68 |
| 15 | 30 | 55 | 1  | 78 | 43 | 3.1 | 13.3 | 4.3 | 5.73 | 80.2 | 125 | 68 |
| 15 | 20 | 65 | 1  | 79 | 43 | 3.1 | 13.2 | 4.3 | 5.84 | 80.1 | 123 | 67 |
| 15 | 10 | 75 | 1  | 79 | 43 | 3.0 | 13.1 | 4.4 | 6.01 | 80.0 | 122 | 67 |
| 25 | 70 | 5  | 2  | 82 | 41 | 4.1 | 15.9 | 3.9 | 6.91 | 81.2 | 157 | 67 |
| 25 | 60 | 15 | 2  | 82 | 41 | 4.0 | 15.9 | 3.9 | 6.98 | 81.1 | 156 | 68 |
| 25 | 50 | 25 | 2  | 82 | 41 | 4.0 | 15.7 | 4.0 | 7.01 | 81.0 | 155 | 68 |
| 25 | 40 | 35 | 2  | 82 | 41 | 3.9 | 15.5 | 4.0 | 7.04 | 81.0 | 153 | 68 |
| 25 | 30 | 45 | 2  | 82 | 41 | 3.8 | 15.3 | 4.0 | 7.09 | 81.0 | 151 | 68 |
| 25 | 20 | 55 | 2  | 82 | 41 | 3.8 | 15.1 | 4.0 | 7.18 | 80.9 | 148 | 68 |
| 25 | 10 | 65 | 2  | 83 | 41 | 3.7 | 15.1 | 4.1 | 7.31 | 80.8 | 147 | 67 |

Example 6: Results for a Moderate-Temperature Cooling, Comparison with R404a and R407c HFC-32/HFC-152a/HFO-1243zf mixture:

| Composition (%) | | | Temp evap outlet (° C.) | Temp comp outlet (° C.) | T cond outlet (° C.) | evap P (bar) | cond P (bar) | Ratio (w/w) | Glide | comp efficiency | % CAP | % COP/COPLorenz |
|---|---|---|---|---|---|---|---|---|---|---|---|---|
| R404A | | | −5 | 77 | 50 | 5.2 | 23.0 | 4.5 | 0.37 | 79.7 | 100 | 48 |
| R407C | | | −1 | 89 | 45 | 4.5 | 19.8 | 4.4 | 4.46 | 79.9 | 114 | 56 |
| HFC-32 | HFC-152a | HFO-1243zf | | | | | | | | | | |
| 25 | 5  | 70 | 1 | 83  | 41 | 4.0 | 15.9 | 3.9 | 6.41 | 81.1 | 105 | 59 |
| 25 | 15 | 60 | 1 | 86  | 41 | 3.9 | 16.0 | 4.1 | 5.65 | 80.6 | 100 | 57 |
| 25 | 25 | 50 | 0 | 89  | 42 | 3.8 | 16.0 | 4.2 | 5.39 | 80.3 | 101 | 58 |
| 25 | 35 | 40 | 0 | 92  | 42 | 3.7 | 15.9 | 4.3 | 5.19 | 80.1 | 102 | 59 |
| 25 | 45 | 30 | 0 | 95  | 42 | 3.6 | 15.8 | 4.4 | 5.05 | 79.8 | 102 | 59 |
| 25 | 55 | 20 | 0 | 98  | 42 | 3.5 | 15.6 | 4.5 | 4.93 | 79.5 | 101 | 60 |
| 25 | 65 | 10 | 0 | 100 | 42 | 3.4 | 15.4 | 4.6 | 4.78 | 79.2 | 100 | 60 |
| 35 | 5  | 60 | 2 | 88  | 41 | 4.6 | 18.1 | 3.9 | 6.67 | 81.2 | 119 | 59 |
| 35 | 15 | 50 | 1 | 92  | 41 | 4.4 | 18.0 | 4.1 | 6.09 | 80.8 | 115 | 57 |
| 35 | 25 | 40 | 1 | 95  | 42 | 4.3 | 17.9 | 4.2 | 5.85 | 80.5 | 115 | 58 |
| 35 | 35 | 30 | 1 | 98  | 42 | 4.2 | 17.8 | 4.3 | 5.76 | 80.2 | 115 | 58 |
| 35 | 45 | 20 | 1 | 101 | 42 | 4.0 | 17.5 | 4.3 | 5.80 | 80.0 | 115 | 59 |
| 35 | 55 | 10 | 1 | 104 | 42 | 3.9 | 17.2 | 4.4 | 5.87 | 79.7 | 114 | 60 |
| 50 | 5  | 45 | 1 | 98  | 43 | 5.4 | 21.6 | 4.0 | 5.61 | 80.9 | 136 | 57 |
| 50 | 15 | 35 | 0 | 101 | 43 | 5.1 | 21.3 | 4.2 | 5.50 | 80.5 | 134 | 57 |
| 50 | 25 | 25 | 1 | 105 | 43 | 4.9 | 21.0 | 4.3 | 5.55 | 80.3 | 132 | 57 |

-continued

| Composition (%) | | | Temp evap outlet (° C.) | Temp comp outlet (° C.) | T cond outlet (° C.) | evap P (bar) | cond P (bar) | Ratio (w/w) | Glide | comp efficiency | % CAP | % COP/ COPLorenz |
|---|---|---|---|---|---|---|---|---|---|---|---|---|
| 50 | 35 | 15 | 1 | 108 | 43 | 4.8 | 20.7 | 4.3 | 5.85 | 80.0 | 132 | 58 |
| 50 | 45 | 5 | 1 | 111 | 43 | 4.6 | 20.2 | 4.4 | 6.31 | 79.8 | 132 | 58 |

HFO-1234yf/HFC-32/HFO-1243zf mixture:

| Composition (%) | | | Temp evap outlet (° C.) | Temp comp outlet (° C.) | T cond outlet (° C.) | evap P (bar) | cond P (bar) | Ratio (w/w) | Glide | comp efficiency | % CAP | % COP/ COPLorenz |
|---|---|---|---|---|---|---|---|---|---|---|---|---|
| R404A | | | −5 | 77 | 50 | 5.2 | 23.0 | 4.5 | 0.37 | 79.7 | 100 | 48 |
| R407C | | | −1 | 89 | 45 | 4.5 | 19.8 | 4.4 | 4.46 | 79.9 | 114 | 56 |

| HFO-1234yf | HFC-32 | HFO-1243zf | | | | | | | | | | |
|---|---|---|---|---|---|---|---|---|---|---|---|---|
| 5  | 25 | 70 | 2  | 81  | 40 | 4.2 | 16.0 | 3.9 | 6.76 | 81.3 | 107 | 60 |
| 15 | 25 | 60 | 2  | 80  | 40 | 4.2 | 16.4 | 3.9 | 6.65 | 81.2 | 109 | 59 |
| 25 | 25 | 50 | 2  | 80  | 41 | 4.3 | 16.8 | 3.9 | 6.55 | 81.2 | 110 | 59 |
| 35 | 25 | 40 | 1  | 80  | 41 | 4.4 | 17.2 | 3.9 | 6.43 | 81.1 | 111 | 58 |
| 45 | 25 | 30 | 1  | 80  | 41 | 4.5 | 17.7 | 3.9 | 6.25 | 81.1 | 112 | 58 |
| 55 | 25 | 20 | 1  | 80  | 42 | 4.6 | 18.2 | 4.0 | 6.02 | 81.0 | 112 | 57 |
| 65 | 25 | 10 | 1  | 80  | 43 | 4.7 | 18.6 | 4.0 | 5.77 | 81.0 | 112 | 57 |
| 5  | 35 | 60 | 2  | 86  | 41 | 4.8 | 18.3 | 3.8 | 6.94 | 81.3 | 123 | 59 |
| 15 | 35 | 50 | 2  | 86  | 41 | 4.9 | 18.8 | 3.8 | 6.73 | 81.3 | 124 | 59 |
| 25 | 35 | 40 | 1  | 86  | 42 | 5.0 | 19.3 | 3.9 | 6.47 | 81.2 | 125 | 58 |
| 35 | 35 | 30 | 1  | 86  | 42 | 5.1 | 19.9 | 3.9 | 6.16 | 81.1 | 125 | 57 |
| 45 | 35 | 20 | 1  | 87  | 43 | 5.2 | 20.4 | 4.0 | 5.78 | 81.0 | 125 | 57 |
| 5  | 50 | 45 | 0  | 96  | 43 | 5.5 | 22.0 | 4.0 | 5.48 | 81.0 | 139 | 58 |
| 15 | 50 | 35 | 0  | 96  | 44 | 5.6 | 22.6 | 4.0 | 5.05 | 80.9 | 139 | 57 |
| 50 | 50 | 0  | −2 | 96  | 47 | 6.0 | 24.9 | 4.2 | 3.36 | 80.5 |     | 54 |
| 30 | 70 | 0  | −4 | 110 | 49 | 6.5 | 28.4 | 4.4 | 1.15 | 75.9 |     | 53 |

The last two lines of the table provide a comparative example (binary mixtures resulting from document WO 2009/150763, less effective than the ternary mixtures according to the invention).

HFC-32/HFO-1243zf/HFO-1234ze mixture:

| Composition (%) | | | Temp evap outlet (° C.) | Temp comp outlet (° C.) | T cond outlet (° C.) | evap P (bar) | cond P (bar) | Ratio (w/w) | Glide | comp efficiency | % CAP | % COP/ COPLorenz |
|---|---|---|---|---|---|---|---|---|---|---|---|---|
| R404A | | | −5 | 77 | 50 | 5.2 | 23.0 | 4.5 | 0.37 | 79.7 | 100 | 48 |
| R407C | | | −1 | 89 | 45 | 4.5 | 19.8 | 4.4 | 4.46 | 79.9 | 114 | 56 |

| HFC-32 | HFO-1243zf | HFO-1234ze | | | | | | | | | | |
|---|---|---|---|---|---|---|---|---|---|---|---|---|
| 25 | 70 | 5  | 2 | 82 | 41 | 4.1 | 15.9 | 3.9 | 6.91 | 81.2 | 107 | 60 |
| 25 | 60 | 15 | 2 | 82 | 41 | 4.0 | 15.9 | 3.9 | 6.98 | 81.1 | 107 | 60 |
| 25 | 50 | 25 | 2 | 82 | 41 | 4.0 | 15.7 | 4.0 | 7.01 | 81.0 | 106 | 60 |
| 25 | 40 | 35 | 2 | 82 | 41 | 3.9 | 15.5 | 4.0 | 7.04 | 81.0 | 105 | 61 |
| 25 | 30 | 45 | 2 | 82 | 41 | 3.8 | 15.3 | 4.0 | 7.09 | 81.0 | 103 | 61 |
| 25 | 20 | 55 | 2 | 82 | 41 | 3.8 | 15.1 | 4.0 | 7.18 | 80.9 | 101 | 61 |
| 25 | 10 | 65 | 2 | 83 | 41 | 3.7 | 15.1 | 4.1 | 7.31 | 80.8 | 100 | 60 |
| 35 | 60 | 5  | 2 | 87 | 41 | 4.7 | 18.1 | 3.8 | 7.09 | 81.3 | 122 | 60 |
| 35 | 50 | 15 | 2 | 87 | 41 | 4.6 | 18.0 | 3.9 | 7.16 | 81.2 | 121 | 60 |
| 35 | 40 | 25 | 2 | 87 | 41 | 4.6 | 17.7 | 3.9 | 7.24 | 81.2 | 121 | 60 |
| 35 | 30 | 35 | 2 | 87 | 41 | 4.5 | 17.4 | 3.9 | 7.35 | 81.2 | 119 | 61 |
| 35 | 20 | 45 | 2 | 87 | 41 | 4.4 | 17.1 | 3.9 | 7.47 | 81.2 | 118 | 61 |
| 35 | 10 | 55 | 3 | 87 | 41 | 4.3 | 17.1 | 3.9 | 7.59 | 81.1 | 116 | 60 |
| 50 | 45 | 5  | 1 | 96 | 43 | 5.5 | 21.6 | 4.0 | 5.83 | 81.0 | 138 | 58 |
| 50 | 35 | 15 | 1 | 96 | 43 | 5.4 | 21.2 | 4.0 | 6.17 | 81.0 | 138 | 58 |
| 50 | 25 | 25 | 2 | 96 | 42 | 5.3 | 20.7 | 3.9 | 6.52 | 81.1 | 138 | 59 |
| 50 | 15 | 35 | 2 | 96 | 42 | 5.2 | 20.4 | 3.9 | 6.83 | 81.1 | 137 | 59 |
| 50 | 5  | 45 | 2 | 96 | 42 | 5.1 | 20.3 | 4.0 | 7.05 | 81.0 | 136 | 59 |

Example 7: Results for a Moderate-Temperature Heating, Comparison with R404a and R407c HFC-32/HFC-152a/HFO-1243zf mixture:

| Composition (%) | | | Temp evap outlet (° C.) | Temp comp outlet (° C.) | T cond outlet (° C.) | evap P (bar) | cond P (bar) | Ratio (w/w) | Glide | comp efficiency | % CAPc | % COPc/ COPLorenz |
|---|---|---|---|---|---|---|---|---|---|---|---|---|
| R404A | | | −5 | 77 | 50 | 5.2 | 23.0 | 4.5 | 0.37 | 79.7 | 100 | 58 |
| R407C | | | −1 | 89 | 45 | 4.5 | 19.8 | 4.4 | 4.46 | 79.9 | 107 | 64 |
| HFC-32 | HFC-152a | HFO-1243zf | | | | | | | | | | |
| 25 | 5 | 70 | 1 | 83 | 41 | 4.0 | 15.9 | 3.9 | 6.41 | 81.1 | 96 | 67 |
| 35 | 5 | 60 | 2 | 88 | 41 | 4.6 | 18.1 | 3.9 | 6.67 | 81.2 | 109 | 66 |
| 35 | 15 | 50 | 1 | 92 | 41 | 4.4 | 18.0 | 4.1 | 6.09 | 80.8 | 107 | 66 |
| 35 | 25 | 40 | 1 | 95 | 42 | 4.3 | 17.9 | 4.2 | 5.85 | 80.5 | 106 | 66 |
| 35 | 35 | 30 | 1 | 98 | 42 | 4.2 | 17.8 | 4.3 | 5.76 | 80.2 | 106 | 66 |
| 35 | 45 | 20 | 1 | 101 | 42 | 4.0 | 17.5 | 4.3 | 5.80 | 80.0 | 105 | 67 |
| 35 | 55 | 10 | 1 | 104 | 42 | 3.9 | 17.2 | 4.4 | 5.87 | 79.7 | 104 | 67 |
| 50 | 5 | 45 | 1 | 98 | 43 | 5.4 | 21.6 | 4.0 | 5.61 | 80.9 | 125 | 65 |
| 50 | 15 | 35 | 0 | 101 | 43 | 5.1 | 21.3 | 4.2 | 5.50 | 80.5 | 123 | 65 |
| 50 | 25 | 25 | 1 | 105 | 43 | 4.9 | 21.0 | 4.3 | 5.55 | 80.3 | 122 | 65 |
| 50 | 35 | 15 | 1 | 108 | 43 | 4.8 | 20.7 | 4.3 | 5.85 | 80.0 | 121 | 65 |
| 50 | 45 | 5 | 1 | 111 | 43 | 4.6 | 20.2 | 4.4 | 6.31 | 79.8 | 119 | 65 |

HFO-1234yf/HFC-32/HFO-1243zf mixture:

| Composition (%) | | | Temp evap outlet (° C.) | Temp comp outlet (° C.) | T cond outlet (° C.) | evap P (bar) | cond P (bar) | Ratio (w/w) | Glide | comp efficiency | % CAPc | % COP/ COPLorenz |
|---|---|---|---|---|---|---|---|---|---|---|---|---|
| R404A | | | −5 | 77 | 50 | 5.2 | 23.0 | 4.5 | 0.37 | 79.7 | 100 | 58 |
| R407C | | | −1 | 89 | 45 | 4.5 | 19.8 | 4.4 | 4.46 | 79.9 | 107 | 64 |
| HFO-1234yf | HFC-32 | HFO-1243zf | | | | | | | | | | |
| 5 | 25 | 70 | 2 | 81 | 40 | 4.2 | 16.0 | 3.9 | 6.76 | 81.3 | 98 | 67 |
| 15 | 25 | 60 | 2 | 80 | 40 | 4.2 | 16.4 | 3.9 | 6.65 | 81.2 | 99 | 67 |
| 25 | 25 | 50 | 2 | 80 | 41 | 4.3 | 16.8 | 3.9 | 6.55 | 81.2 | 101 | 67 |
| 35 | 25 | 40 | 1 | 80 | 41 | 4.4 | 17.2 | 3.9 | 6.43 | 81.1 | 102 | 66 |
| 45 | 25 | 30 | 1 | 80 | 41 | 4.5 | 17.7 | 3.9 | 6.25 | 81.1 | 102 | 65 |
| 55 | 25 | 20 | 1 | 80 | 42 | 4.6 | 18.2 | 4.0 | 6.02 | 81.0 | 103 | 65 |
| 5 | 35 | 60 | 2 | 86 | 41 | 4.8 | 18.3 | 3.8 | 6.94 | 81.3 | 112 | 67 |
| 15 | 35 | 50 | 2 | 86 | 41 | 4.9 | 18.8 | 3.8 | 6.73 | 81.3 | 113 | 66 |
| 25 | 35 | 40 | 1 | 86 | 42 | 5.0 | 19.3 | 3.9 | 6.47 | 81.2 | 113 | 65 |

HFC-32/HFO-1243zf/HFO-1234ze mixture:

| Composition (%) | | | Temp evap outlet (° C.) | Temp comp outlet (° C.) | T cond outlet (° C.) | evap P (bar) | cond P (bar) | Ratio (w/w) | Glide | comp efficiency | % CAP | % COPc/ COPLorenz |
|---|---|---|---|---|---|---|---|---|---|---|---|---|
| R404A | | | −5 | 77 | 50 | 5.2 | 23.0 | 4.5 | 0.37 | 79.7 | 100 | 58 |
| R407C | | | −1 | 89 | 45 | 4.5 | 19.8 | 4.4 | 4.46 | 79.9 | 107 | 64 |
| HFC-32 | HFO-1243zf | HFO-1234ze | | | | | | | | | | |
| 35 | 60 | 5 | 2 | 87 | 41 | 4.7 | 18.1 | 3.8 | 7.09 | 81.3 | 111 | 67 |
| 35 | 50 | 15 | 2 | 87 | 41 | 4.6 | 18.0 | 3.9 | 7.16 | 81.2 | 110 | 67 |
| 35 | 40 | 25 | 2 | 87 | 41 | 4.6 | 17.7 | 3.9 | 7.24 | 81.2 | 109 | 67 |
| 35 | 30 | 35 | 2 | 87 | 41 | 4.5 | 17.4 | 3.9 | 7.35 | 81.2 | 108 | 68 |
| 35 | 20 | 45 | 2 | 87 | 41 | 4.4 | 17.1 | 3.9 | 7.47 | 81.2 | 106 | 68 |
| 35 | 10 | 55 | 3 | 87 | 41 | 4.3 | 17.1 | 3.9 | 7.59 | 81.1 | 105 | 67 |
| 50 | 45 | 5 | 1 | 96 | 43 | 5.5 | 21.6 | 4.0 | 5.83 | 81.0 | 127 | 65 |
| 50 | 35 | 15 | 1 | 96 | 43 | 5.4 | 21.2 | 4.0 | 6.17 | 81.0 | 126 | 66 |
| 50 | 25 | 25 | 2 | 96 | 42 | 5.3 | 20.7 | 3.9 | 6.52 | 81.1 | 125 | 66 |
| 50 | 15 | 35 | 2 | 96 | 42 | 5.2 | 20.4 | 3.9 | 6.83 | 81.1 | 124 | 66 |
| 50 | 5 | 45 | 2 | 96 | 42 | 5.1 | 20.3 | 4.0 | 7.05 | 81.0 | 123 | 66 |
| 65 | 10 | 25 | 0 | 106 | 44 | 5.9 | 23.9 | 4.1 | 5.18 | 80.7 | 138 | 65 |

Example 8: Results for a Moderate-Temperature Cooling, Comparison with R410a

HFC-32/HFC-152a/HFO-1243zf mixture:

| Composition (%) | | | Temp evap outlet (° C.) | Temp comp outlet (° C.) | T cond outlet (° C.) | evap P (bar) | cond P (bar) | Ratio (w/w) | Glide | comp efficiency | % CAP | % COP/COPLorenz |
|---|---|---|---|---|---|---|---|---|---|---|---|---|
| R410A | | | −5 | 103 | 50 | 6.8 | 30.7 | 4.5 | 0.07 | 79.5 | 100 | 50 |
| HFC-32 | HFC-152a | HFO-1243zf | | | | | | | | | | |
| 65 | 5 | 30 | −1 | 109 | 46 | 5.9 | 25.2 | 4.3 | 3.76 | 80.3 | 99 | 55 |
| 65 | 15 | 20 | −1 | 112 | 46 | 5.7 | 24.7 | 4.4 | 4.20 | 80.0 | 98 | 55 |
| 65 | 25 | 10 | 0 | 116 | 46 | 5.4 | 24.1 | 4.4 | 4.84 | 79.7 | 97 | 56 |
| 80 | 5 | 15 | −3 | 120 | 48 | 6.3 | 28.3 | 4.5 | 2.06 | 79.6 | 106 | 54 |
| 80 | 15 | 5 | −2 | 124 | 48 | 6.1 | 27.5 | 4.5 | 3.17 | 79.4 | 105 | 54 |
| 90 | 5 | 5 | −4 | 127 | 49 | 6.6 | 29.8 | 4.5 | 1.35 | 79.4 | 110 | 53 |

HFO-1234yf/HFC-32/HFO-1243zf mixture:

| Composition (%) | | | Temp evap outlet (° C.) | Temp comp outlet (° C.) | T cond outlet (° C.) | evap P (bar) | cond P (bar) | Ratio (w/w) | Glide | comp efficiency | % CAP | % COP/COPLorenz |
|---|---|---|---|---|---|---|---|---|---|---|---|---|
| R410A | | | −5 | 103 | 50 | 6.8 | 30.7 | 4.5 | 0.07 | 79.5 | 100 | 50 |
| HFO-1234yf | HFC-32 | HFO-1243zf | | | | | | | | | | |
| 5 | 65 | 30 | −2 | 107 | 46 | 6.1 | 25.8 | 4.2 | 3.17 | 80.4 | 100 | 55 |
| 15 | 65 | 20 | −2 | 107 | 47 | 6.2 | 26.4 | 4.3 | 2.60 | 80.2 | 99 | 54 |
| 25 | 65 | 10 | −3 | 107 | 48 | 6.3 | 27.1 | 4.3 | 2.03 | 80.1 | 98 | 53 |
| 5 | 80 | 15 | −4 | 118 | 49 | 6.5 | 29.0 | 4.4 | 1.12 | 79.7 | 105 | 53 |
| 15 | 80 | 5 | −4 | 117 | 49 | 6.6 | 29.5 | 4.4 | 0.66 | 79.7 | 106 | 53 |

HFC-32/HFO-1243zf/HFO-1234ze mixture:

| Composition (%) | | | Temp evap outlet (° C.) | Temp comp outlet (° C.) | T cond outlet (° C.) | evap P (bar) | cond P (bar) | Ratio (w/w) | Glide | comp efficiency | % CAP | % COP/COPLorenz |
|---|---|---|---|---|---|---|---|---|---|---|---|---|
| R410A | | | −5 | 103 | 50 | 6.8 | 30.7 | 4.5 | 0.07 | 79.5 | 100 | 50 |
| HFC-32 | HFO-1243zf | HFO-1234ze | | | | | | | | | | |
| 65 | 30 | 5 | −1 | 107 | 46 | 6.0 | 25.2 | 4.2 | 3.85 | 80.5 | 100 | 56 |
| 65 | 20 | 15 | 0 | 106 | 45 | 5.9 | 24.4 | 4.1 | 4.59 | 80.6 | 101 | 57 |
| 65 | 10 | 25 | 0 | 106 | 44 | 5.9 | 23.9 | 4.1 | 5.18 | 80.7 | 101 | 57 |
| 80 | 15 | 5 | −3 | 118 | 48 | 6.4 | 28.3 | 4.4 | 1.97 | 79.9 | 107 | 54 |
| 80 | 5 | 15 | −2 | 117 | 47 | 6.4 | 27.5 | 4.3 | 2.87 | 80.1 | 107 | 55 |
| 90 | 5 | 5 | −4 | 125 | 49 | 6.7 | 29.9 | 4.5 | 1.00 | 79.6 | 110 | 54 |

Example 9: Results for a Moderate-Temperature Heating, Comparison with R410a

HFC-32/HFC-152a/HFO-1243zf mixture:

| Composition (%) | | | Temp evap outlet (° C.) | Temp comp outlet (° C.) | T cond outlet (° C.) | evap P (bar) | cond P (bar) | Ratio (w/w) | Glide | comp efficiency | % CAPc | % COPc/COPLorenz |
|---|---|---|---|---|---|---|---|---|---|---|---|---|
| R410A | | | −5 | 103 | 50 | 6.8 | 30.7 | 4.5 | 0.07 | 79.5 | 100 | 59 |
| HFC-32 | HFC-152a | HFO-1243zf | | | | | | | | | | |
| 65 | 5 | 30 | −1 | 109 | 46 | 5.9 | 25.2 | 4.3 | 3.76 | 80.3 | 95 | 63 |
| 80 | 5 | 15 | −3 | 120 | 48 | 6.3 | 28.3 | 4.5 | 2.06 | 79.6 | 103 | 62 |
| 80 | 15 | 5 | −2 | 124 | 48 | 6.1 | 27.5 | 4.5 | 3.17 | 79.4 | 102 | 62 |

HFO-1234yf/HFC-32/HFO-1243zf mixture:

| Composition (%) | | | Temp evap outlet (° C.) | Temp comp outlet (° C.) | T cond outlet (° C.) | evap P (bar) | cond P (bar) | Ratio (w/w) | Glide | comp efficiency | % CAP | % COP/COPLorenz |
|---|---|---|---|---|---|---|---|---|---|---|---|---|
| R410A | | | −5 | 103 | 50 | 6.8 | 30.7 | 4.5 | 0.07 | 79.5 | 100 | 59 |
| HFO-1234yf | HFC-32 | HFO-1243zf | | | | | | | | | | |
| 5 | 80 | 15 | −4 | 118 | 49 | 6.5 | 29.0 | 4.4 | 1.12 | 79.7 | 104 | 61 |
| 15 | 80 | 5 | −4 | 117 | 49 | 6.6 | 29.5 | 4.4 | 0.66 | 79.7 | 104 | 61 |

HFC-32/HFO-1243zf/HFO-1234ze mixture:

| Composition (%) | | | Temp evap outlet (° C.) | Temp comp outlet (° C.) | T cond outlet (° C.) | evap P (bar) | cond P (bar) | Ratio (w/w) | Glide | comp efficiency | % CAP | % COPc/COPLorenz |
|---|---|---|---|---|---|---|---|---|---|---|---|---|
| R410A | | | −5 | 103 | 50 | 6.8 | 30.7 | 4.5 | 0.07 | 79.5 | 100 | 59 |
| HFC-32 | HFO-1243zf | HFO-1234ze | | | | | | | | | | |
| 80 | 15 | 5 | −3 | 118 | 48 | 6.4 | 28.3 | 4.4 | 1.97 | 79.9 | 104 | 62 |
| 80 | 5 | 15 | −2 | 117 | 47 | 6.4 | 27.5 | 4.3 | 2.87 | 80.1 | 103 | 63 |

Example 10: Results for a Low-Temperature Refrigeration, Comparison with HFC-32

HFO-1234yf/HFC-32/HFO-1243zf mixture:

| Composition (%) | | | Temp evap outlet (° C.) | Temp comp outlet (° C.) | T cond outlet (° C.) | evap P (bar) | cond P (bar) | Ratio (w/w) | Glide | comp efficiency | % CAP | % COP/COPLorenz |
|---|---|---|---|---|---|---|---|---|---|---|---|---|
| R32 | | | −30 | 215 | 40 | 2.7 | 24.8 | 9.0 | 0.0 | 51.6 | 100 | 34 |
| HFO-1234yf | HFC-32 | HFO-1243zf | | | | | | | | | | |
| 23 | 75 | 2 | −29 | 172 | 39 | 2.6 | 22.9 | 8.7 | 0.8 | 54.2 | 91 | 36 |
| 21 | 75 | 4 | −29 | 173 | 39 | 2.6 | 22.8 | 8.8 | 1.0 | 54.0 | 91 | 36 |
| 19 | 75 | 6 | −29 | 173 | 39 | 2.6 | 22.8 | 8.8 | 1.1 | 53.9 | 90 | 35 |
| 17 | 75 | 8 | −29 | 174 | 39 | 2.6 | 22.7 | 8.8 | 1.2 | 53.8 | 90 | 35 |
| 18 | 80 | 2 | −29 | 180 | 39 | 2.6 | 23.4 | 8.8 | 0.5 | 53.5 | 93 | 35 |
| 16 | 80 | 4 | −29 | 181 | 39 | 2.6 | 23.3 | 8.8 | 0.7 | 53.4 | 93 | 35 |
| 14 | 80 | 6 | −29 | 182 | 39 | 2.6 | 23.2 | 8.9 | 0.8 | 53.2 | 92 | 35 |
| 12 | 80 | 8 | −29 | 183 | 39 | 2.6 | 23.2 | 8.9 | 0.9 | 53.1 | 92 | 35 |
| 10 | 80 | 10 | −29 | 184 | 39 | 2.6 | 23.1 | 8.9 | 1.0 | 53.0 | 92 | 35 |
| 12 | 86 | 2 | −30 | 191 | 40 | 2.7 | 23.9 | 8.9 | 0.3 | 52.8 | 95 | 35 |
| 10 | 86 | 4 | −30 | 192 | 40 | 2.7 | 23.8 | 8.9 | 0.4 | 52.7 | 95 | 35 |
| 8 | 86 | 6 | −29 | 193 | 39 | 2.7 | 23.7 | 8.9 | 0.5 | 52.5 | 95 | 35 |
| 8 | 90 | 2 | −30 | 198 | 40 | 2.7 | 24.1 | 9.0 | 0.2 | 52.4 | 96 | 35 |

Example 11: Results for a Moderate-Temperature Cooling, Comparison with HFC-32

HFO-1234yf/HFC-32/HFO-1243zf mixture:

| Composition (%) | | | Temp evap outlet (° C.) | Temp comp outlet (° C.) | T cond outlet (° C.) | evap P (bar) | cond P (bar) | Ratio (w/w) | Glide | comp efficiency | % CAP | % COP/COPLorenz |
|---|---|---|---|---|---|---|---|---|---|---|---|---|
| R32 | | | −5 | 132 | 50 | 6.9 | 31.4 | 4.6 | 0.0 | 79.3 | 100 | 53 |
| HFO-1234yf | HFC-32 | HFO-1243zf | | | | | | | | | | |
| 23 | 75 | 2 | −4 | 114 | 49 | 6.6 | 29.0 | 4.4 | 0.84 | 79.8 | 91 | 53 |
| 21 | 75 | 4 | −4 | 114 | 49 | 6.6 | 28.9 | 4.4 | 0.92 | 79.8 | 90 | 53 |
| 19 | 75 | 6 | −4 | 114 | 49 | 6.5 | 28.8 | 4.4 | 1.00 | 79.8 | 90 | 53 |
| 18 | 80 | 2 | −4 | 117 | 49 | 6.7 | 29.6 | 4.4 | 0.55 | 79.7 | 93 | 53 |

-continued

| Composition (%) | | | Temp evap outlet (° C.) | Temp comp outlet (° C.) | T cond outlet (° C.) | evap P (bar) | cond P (bar) | Ratio (w/w) | Glide | comp efficiency | % CAP | % COP/COPLorenz |
|---|---|---|---|---|---|---|---|---|---|---|---|---|
| 16 | 80 | 4 | −4 | 117 | 49 | 6.6 | 29.5 | 4.4 | 0.62 | 79.7 | 92 | 53 |
| 14 | 80 | 6 | −4 | 117 | 49 | 6.6 | 29.4 | 4.4 | 0.70 | 79.7 | 92 | 53 |
| 12 | 80 | 8 | −4 | 117 | 49 | 6.6 | 29.3 | 4.4 | 0.79 | 79.7 | 92 | 53 |
| 10 | 80 | 10 | −4 | 118 | 49 | 6.6 | 29.2 | 4.4 | 0.88 | 79.7 | 92 | 53 |
| 8 | 80 | 12 | −4 | 118 | 49 | 6.6 | 29.1 | 4.4 | 0.97 | 79.7 | 92 | 53 |
| 6 | 80 | 14 | −4 | 118 | 49 | 6.5 | 29.0 | 4.4 | 1.07 | 79.7 | 92 | 53 |
| 4 | 80 | 16 | −4 | 118 | 49 | 6.5 | 28.9 | 4.4 | 1.17 | 79.7 | 92 | 53 |
| 2 | 80 | 18 | −4 | 118 | 49 | 6.5 | 28.8 | 4.4 | 1.28 | 79.7 | 92 | 53 |
| 12 | 86 | 2 | −5 | 122 | 50 | 6.7 | 30.2 | 4.5 | 0.30 | 79.6 | 95 | 53 |
| 10 | 86 | 4 | −5 | 122 | 49 | 6.7 | 30.2 | 4.5 | 0.37 | 79.6 | 95 | 53 |
| 8 | 86 | 6 | −5 | 122 | 49 | 6.7 | 30.1 | 4.5 | 0.44 | 79.6 | 95 | 53 |
| 6 | 86 | 8 | −4 | 122 | 49 | 6.7 | 30.0 | 4.5 | 0.52 | 79.6 | 95 | 53 |
| 4 | 86 | 10 | −4 | 122 | 49 | 6.7 | 29.9 | 4.5 | 0.61 | 79.6 | 95 | 53 |
| 2 | 86 | 12 | −4 | 122 | 49 | 6.6 | 29.8 | 4.5 | 0.69 | 79.6 | 95 | 53 |

Example 12: Results for a Moderate-Temperature Heating, Comparison with HFC-32

HFO-1234yf/HFC-32/HFO-1243zf mixture:

| Composition (%) | | | Temp evap outlet (° C.) | Temp comp outlet (° C.) | T cond outlet (° C.) | evap P (bar) | cond P (bar) | Ratio (w/w) | Glide | comp efficiency | % CAP | % COP/COPLorenz |
|---|---|---|---|---|---|---|---|---|---|---|---|---|
| R32 | | | −5 | 132 | 50 | 6.9 | 31.4 | 4.6 | 0.0 | 79.3 | 100 | 61 |

| HFO-1234yf | HFC-32 | HFO-1243zf | | | | | | | | | | |
|---|---|---|---|---|---|---|---|---|---|---|---|---|
| 23 | 75 | 2 | −4 | 114 | 49 | 6.6 | 29.0 | 4.4 | 0.84 | 79.8 | 91 | 61 |
| 21 | 75 | 4 | −4 | 114 | 49 | 6.6 | 28.9 | 4.4 | 0.92 | 79.8 | 91 | 61 |
| 19 | 75 | 6 | −4 | 114 | 49 | 6.5 | 28.8 | 4.4 | 1.00 | 79.8 | 91 | 61 |
| 18 | 80 | 2 | −4 | 117 | 49 | 6.7 | 29.6 | 4.4 | 0.55 | 79.7 | 93 | 61 |
| 16 | 80 | 4 | −4 | 117 | 49 | 6.6 | 29.5 | 4.4 | 0.62 | 79.7 | 93 | 61 |
| 14 | 80 | 6 | −4 | 117 | 49 | 6.6 | 29.4 | 4.4 | 0.70 | 79.7 | 93 | 61 |
| 12 | 80 | 8 | −4 | 117 | 49 | 6.6 | 29.3 | 4.4 | 0.79 | 79.7 | 93 | 61 |
| 12 | 86 | 2 | −5 | 122 | 50 | 6.7 | 30.2 | 4.5 | 0.30 | 79.6 | 95 | 61 |
| 10 | 86 | 4 | −5 | 122 | 49 | 6.7 | 30.2 | 4.5 | 0.37 | 79.6 | 95 | 61 |
| 8 | 86 | 6 | −5 | 122 | 49 | 6.7 | 30.1 | 4.5 | 0.44 | 79.6 | 95 | 61 |
| 6 | 86 | 8 | −4 | 122 | 49 | 6.7 | 30.0 | 4.5 | 0.52 | 79.6 | 95 | 61 |
| 4 | 86 | 10 | −4 | 122 | 49 | 6.7 | 29.9 | 4.5 | 0.61 | 79.6 | 95 | 61 |
| 2 | 86 | 12 | −4 | 122 | 49 | 6.6 | 29.8 | 4.5 | 0.69 | 79.6 | 95 | 61 |

Example 13: Data Regarding the Quasi-Azeotropic Mixtures

HFC-32/HFC-152a/HFO-1243zf mixture:

| HFC-32 | HFC-152a | HFO-1243zf | Temperature (° C.) | Psat liquid (bar) | Psat vapor (bar) | % diff in pressure |
|---|---|---|---|---|---|---|
| 75 | 2 | 23 | −5 | 6.4 | 5.8 | 9 |
| 80 | 2 | 18 | −5 | 6.5 | 6.1 | 7 |
| 86 | 9 | 5 | −5 | 6.5 | 5.9 | 9 |
| 86 | 2 | 12 | −5 | 6.6 | 6.3 | 5 |
| 90 | 8 | 2 | −5 | 6.6 | 6.1 | 7 |
| 90 | 5 | 5 | −5 | 6.6 | 6.3 | 5 |
| 90 | 2 | 8 | −5 | 6.7 | 6.5 | 3 |

HFO-1234yf/HFC-32/HFO-1243zf mixture:

| HFO-1234yf | HFC-32 | HFO-1243zf | Temperature (° C.) | Psat liquid (bar) | Psat vapor (bar) | % diff in pressure |
|---|---|---|---|---|---|---|
| 28 | 70 | 2 | −5 | 6.5 | 6.2 | 5 |
| 20 | 70 | 10 | −5 | 6.5 | 6.1 | 6 |
| 10 | 70 | 20 | −5 | 6.4 | 5.9 | 8 |
| 23 | 75 | 2 | −5 | 6.6 | 6.4 | 3 |
| 20 | 75 | 5 | −5 | 6.6 | 6.3 | 4 |
| 10 | 75 | 15 | −5 | 6.5 | 6.1 | 6 |
| 2 | 75 | 23 | −5 | 6.5 | 6.0 | 7 |
| 18 | 80 | 2 | −5 | 6.7 | 6.5 | 2 |
| 15 | 80 | 5 | −5 | 6.7 | 6.5 | 3 |
| 10 | 80 | 10 | −5 | 6.6 | 6.4 | 4 |
| 2 | 80 | 18 | −5 | 6.6 | 6.2 | 5 |
| 12 | 86 | 2 | −5 | 6.8 | 6.7 | 1 |
| 9 | 86 | 5 | −5 | 6.7 | 6.6 | 2 |
| 2 | 86 | 12 | −5 | 6.7 | 6.5 | 3 |
| 8 | 90 | 2 | −5 | 6.8 | 6.7 | 1 |
| 5 | 90 | 5 | −5 | 6.8 | 6.7 | 1 |
| 2 | 90 | 8 | −5 | 6.8 | 6.6 | 2 |

HFC-32/HFO-1243zf/HFO-1234ze mixture:

| HFC-32 | HFO-1243zf | HFO-1234ze | Temperature (° C.) | Psat liquid (bar) | Psat vapor (bar) | % diff in pressure |
|---|---|---|---|---|---|---|
| 75 | 23 | 2 | −5 | 6.4 | 5.9 | 9 |
| 80 | 10 | 10 | −5 | 6.5 | 5.9 | 9 |
| 80 | 18 | 2 | −5 | 6.5 | 6.1 | 6 |
| 86 | 2 | 12 | −5 | 6.6 | 6.1 | 7 |
| 86 | 5 | 9 | −5 | 6.6 | 6.2 | 7 |
| 86 | 12 | 2 | −5 | 6.7 | 6.4 | 4 |
| 90 | 2 | 8 | −5 | 6.7 | 6.4 | 5 |
| 90 | 5 | 5 | −5 | 6.7 | 6.5 | 4 |
| 90 | 8 | 2 | −5 | 6.7 | 6.5 | 3 |

The invention claimed is:

1. A ternary composition comprising:
difluoromethane;
3,3,3-trifluoropropene; and
2,3,3,3-tetrafluoropropene,
wherein the ternary composition is selected from one of the following compositions:
 a ternary composition comprising:
  from 25 to 50% of difluoromethane;
  from 2 to 65% of 3,3,3-trifluoropropene; and
  from 10 to 70% of 2,3,3,3-tetrafluoropropene,
 a ternary composition comprising:
  from 65 to 80% of difluoromethane;
  from 2 to 15% of 3,3,3-trifluoropropene; and
  from 5 to 30% of 2,3,3,3-tetrafluoropropene,
 a ternary composition comprising:
  from 25 to 35% of difluoromethane;
  from 2 to 70% of 3,3,3-trifluoropropene; and
  from 5 to 65% of 2,3,3,3-tetrafluoropropene,
 a ternary composition comprising:
  from 65 to 80% of difluoromethane;
  from 5 to 30% of 3,3,3-trifluoropropene; and
  from 5 to 25% of 2,3,3,3-tetrafluoropropene,
 a ternary composition comprising:
  from 75 to 90% of difluoromethane;
  from 2 to 10% of 3,3,3-trifluoropropene; and
  from 8 to 23% of 2,3,3,3-tetrafluoropropene,
 a ternary composition comprising:
  from 75 to 90% of difluoromethane;
  from 2 to 18% of 3,3,3-trifluoropropene; and
  from 2 to 23% of 2,3,3,3-tetrafluoropropene, and
 a ternary composition comprising:
  from 70 to 98% of difluoromethane;
  from 1 to 23% of 3,3,3-trifluoropropene; and
  from 1 to 28% of 2,3,3,3-tetrafluoropropene.

2. The composition as claimed in claim 1 comprising:
from 25 to 50% of difluoromethane;
from 2 to 65% of 3,3,3-trifluoropropene; and
from 10 to 70% of 2,3,3,3-tetrafluoropropene.

3. The composition as claimed in claim 1 comprising:
from 65 to 80% of difluoromethane;
from 2 to 15% of 3,3,3-trifluoropropene; and
from 5 to 30% of 2,3,3,3-tetrafluoropropene.

4. The composition as claimed in claim 1 comprising:
from 25 to 35% of difluoromethane;
from 2 to 70% of 3,3,3-trifluoropropene; and
from 5 to 65% of 2,3,3,3-tetrafluoropropene.

5. The composition as claimed in claim 1 comprising:
from 65 to 80% of difluoromethane;
from 5 to 30% of 3,3,3-trifluoropropene; and
from 5 to 25% of 2,3,3,3-tetrafluoropropene.

6. The composition as claimed in claim 1 comprising:
from 75 to 90% of difluoromethane;
from 2 to 10% of 3,3,3-trifluoropropene; and
from 8 to 23% of 2,3,3,3-tetrafluoropropene.

7. The composition as claimed in claim 1 comprising:
from 75 to 90% of difluoromethane;
from 2 to 18% of 3,3,3-trifluoropropene; and
from 2 to 23% of 2,3,3,3-tetrafluoropropene.

8. The composition as claimed in claim 1 comprising:
from 70 to 98% of difluoromethane;
from 1 to 23% of 3,3,3-trifluoropropene; and
from 1 to 28% of 2,3,3,3-tetrafluoropropene.

9. A heat-transfer composition comprising the composition as claimed in claim 1, the heat-transfer composition further comprising one or more additives selected from the group consisting of lubricants, stabilizers, surfactants, tracers, fluorescent agents, odorous agents, solubilizing agents and mixtures thereof.

10. A heat-transfer composition consisting of the composition as claimed in claim 1 and optionally one or more additives selected from the group consisting of lubricants, stabilizers, surfactants, tracers, fluorescent agents, odorous agents, solubilizing agents and mixtures thereof.

11. Heat-transfer equipment comprising a vapor compression circuit containing a composition as claimed in claim 10.

12. A vapor compression circuit comprising the composition as claimed in claim 1.

13. The vapor compression circuit as claimed in claim 12, comprising a countercurrent heat exchanger.

14. Heat-transfer equipment comprising a vapor compression circuit containing a composition as claimed in claim 1.

15. The equipment as claimed in claim 14, comprising a countercurrent heat exchanger.

16. A process for heating or cooling a fluid or a body by means of a vapor compression circuit containing a heat-transfer fluid, said process successively comprising the evaporation of the heat-transfer fluid, the compression of the heat-transfer fluid, the condensation of the heat fluid and the expansion of the heat-transfer fluid, in which the heat-transfer fluid is a composition as claimed in claim 1.

17. A process for cooling a fluid or a body by means of a vapor compression circuit containing a heat-transfer fluid, said process successively comprising the evaporation of the heat-transfer fluid, the compression of the heat-transfer fluid, the condensation of the heat fluid and the expansion of the heat-transfer fluid, in which the temperature of the fluid or the body cooled is from −40° C. to −10° C., and in which the heat-transfer fluid is a ternary composition comprising:
 from 58 to 90% of difluoromethane, 2 to 40% of 3,3,3-trifluoropropene, and from 2 to 40% of 2,3,3,3-tetrafluoropropene; or
 from 68 to 96% of difluoromethane, from 2 to 20% of 3,3,3-trifluoropropene, and from 2 to 30% of 2,3,3,3-tetrafluoropropene.

18. A process for cooling a fluid or a body by means of a vapor compression circuit containing a heat-transfer fluid, said process successively comprising the evaporation of the heat-transfer fluid, the compression of the heat-transfer fluid, the condensation of the heat fluid and the expansion of the heat-transfer fluid, in which the temperature of the fluid or of the body cooled is from −15° C. to 15° C., and in which the heat-transfer fluid is a ternary composition comprising:
 from 60 to 90% of difluoromethane, from 2 to 30% of 3,3,3-trifluoropropene, and from 2 to 30% of 2,3,3,3-tetrafluoropropene; or
 from 58 to 90% of difluoromethane, from 2 to 40% of 3,3,3-trifluoropropene, and from 2 to 40% of 2,3,3,3-tetrafluoropropene.

19. A process for heating a fluid or a body by means of a vapor compression circuit containing a heat-transfer fluid, said process successively comprising the evaporation of the heat-transfer fluid, the compression of the heat-transfer fluid, the condensation of the heat fluid and the expansion of the heat-transfer fluid, in which the temperature of the fluid or of the body heated is from 30° C. to 80° C., and in which the heat-transfer fluid is a ternary composition comprising:

from 60 to 90% of difluoromethane, from 2 to 30% of 3,3,3-trifluoropropene, and from 2 to 30% of 2,3,3,3-tetrafluoropropene; or from 58 to 90% of difluoromethane, from 2 to 40% of 3,3,3-trifluoropropene, and from 2 to 40% of 2,3,3,3-tetrafluoropropene.

20. A process for reducing the environmental impact of a heat-transfer equipment comprising a vapor compression circuit containing an initial heat-transfer fluid, said process comprising a step of replacing the initial heat-transfer fluid in the vapor compression circuit with a final transfer fluid, the final transfer fluid having a GWP lower than the initial heat-transfer fluid, in which the final heat-transfer fluid is a composition as claimed in claim 1.

21. A process for reducing the environmental impact of a heat-transfer equipment comprising a vapor compression circuit containing an initial heat-transfer fluid, said process comprising a step of replacing the initial heat-transfer fluid in the vapor compression circuit with a final transfer fluid, the final transfer fluid having a GWP lower than the initial heat-transfer fluid, in which the initial heat-transfer fluid is a binary mixture of 50% of difluoromethane and 50% of pentafluoroethane, and in which the final heat-transfer fluid is a ternary composition comprising:

from 58 to 90% of difluoromethane, from 2 to 40% of 3,3,3-trifluoropropene, and from 2 to 40% of 2,3,3,3-tetrafluoropropene.

22. A process for reducing the environmental impact of a heat-transfer equipment comprising a vapor compression circuit containing an initial heat-transfer fluid, said process comprising a step of replacing the initial heat-transfer fluid in the vapor compression circuit with a final transfer fluid, the final transfer fluid having a GWP lower than the initial heat-transfer fluid, in which the initial heat-transfer fluid is difluoromethane, and in which the final heat-transfer fluid is a ternary composition comprising:

from 68 to 96% of difluoromethane, from 2 to 20% of 3,3,3-trifluoropropene, and from 2 to 30% of 2,3,3,3-tetrafluoropropene.

* * * * *